US010556495B2

(12) United States Patent
Oya

(10) Patent No.: US 10,556,495 B2
(45) Date of Patent: Feb. 11, 2020

(54) POWER APPARATUS

(71) Applicant: HONDA MOTOR CO., LTD., Tokyo (JP)

(72) Inventor: Satoyoshi Oya, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/028,904

(22) Filed: Jul. 6, 2018

(65) Prior Publication Data

US 2019/0009664 A1    Jan. 10, 2019

(30) Foreign Application Priority Data

Jul. 10, 2017   (JP) .................................. 2017-134839

(51) Int. Cl.
| *B60K 6/26* | (2007.10) |
| *B60K 6/24* | (2007.10) |
| *H02K 7/00* | (2006.01) |
| *B60K 6/387* | (2007.10) |

(52) U.S. Cl.
CPC .................. *B60K 6/26* (2013.01); *B60K 6/24* (2013.01); *B60K 6/387* (2013.01); *H02K 7/006* (2013.01); *B60K 2006/268* (2013.01); *B60Y 2200/92* (2013.01); *B60Y 2400/60* (2013.01)

(58) Field of Classification Search
USPC .............................................. 290/21; 701/22
See application file for complete search history.

(56) References Cited

U.S. PATENT DOCUMENTS 3,508,496 A * 4/1970 Larson ...................... B61B 1/00
                                                          104/130.04
5,534,764 A * 7/1996 Masaki ..................... B60L 3/00
                                                          318/802
(Continued)

FOREIGN PATENT DOCUMENTS

| CN | 101501965 A | 8/2009 |
| CN | 103917425 A | 7/2014 |

(Continued)

OTHER PUBLICATIONS

Feb. 5, 2019, Japanese Office Action issued for related JP Application No. 2017-134839.

(Continued)

*Primary Examiner* — Pedro J Cuevas
(74) *Attorney, Agent, or Firm* — Paratus Law Group, PLLC

(57) ABSTRACT

A power apparatus includes a drive motor, a motor shaft mechanically connected to a wheel of a vehicle, an engine, a crankshaft mechanically connected to the motor shaft and configured to output torque of the engine, a clutch disposed on a power transmission path between the crankshaft and the motor shaft, a controller configured to start-control the engine with the torque of the drive motor, and a magnetic deceleration mechanism which reduces torque of the drive motor necessary for starting the engine by magnetically reducing the rotational speed of the crankshaft during start control. When starting the engine, the controller excites the magnetic deceleration mechanism in a state where the clutch is released.

10 Claims, 13 Drawing Sheets

(56) References Cited

U.S. PATENT DOCUMENTS

| | | | | |
|---|---|---|---|---|
| 6,380,653 | B1* | 4/2002 | Seguchi | B60K 6/26 310/112 |
| 6,484,830 | B1* | 11/2002 | Gruenwald | B60K 6/28 180/65.245 |
| 6,651,759 | B1* | 11/2003 | Gruenwald | B60K 6/28 180/65.245 |
| 7,004,273 | B1* | 2/2006 | Gruenwald | B60K 6/46 180/65.245 |
| 7,204,776 | B2* | 4/2007 | Minagawa | B60K 1/02 475/5 |
| 7,252,165 | B1* | 8/2007 | Gruenwald | B60L 1/003 180/65.25 |
| 7,849,944 | B2* | 12/2010 | DeVault | B60K 6/365 180/65.29 |
| 8,050,834 | B2* | 11/2011 | Kondou | B60W 10/06 701/51 |
| 8,095,255 | B2* | 1/2012 | Ebuchi | B60K 6/365 701/22 |
| 8,197,373 | B2* | 6/2012 | Akutsu | B60K 6/26 475/5 |
| 8,301,350 | B2* | 10/2012 | Inoue | F16H 59/72 701/22 |
| 8,397,848 | B2* | 3/2013 | Read | B60K 6/12 180/65.21 |
| 8,480,522 | B2* | 7/2013 | Akutsu | B60K 6/26 475/5 |
| 8,483,896 | B2* | 7/2013 | Miyazaki | B60K 6/46 701/22 |
| 8,492,913 | B2* | 7/2013 | Koeneman | F01P 3/00 290/1 A |
| 8,564,146 | B2* | 10/2013 | Akutsu | B60K 6/26 290/1 A |
| 8,568,274 | B2* | 10/2013 | Nakamura | F16H 61/0031 477/143 |
| 8,620,507 | B2* | 12/2013 | Akutsu | B60K 6/26 701/22 |
| 8,620,508 | B2* | 12/2013 | Akutsu | B60K 6/26 701/22 |
| 8,666,579 | B2* | 3/2014 | Akutsu | B60K 6/26 701/22 |
| 8,712,618 | B2* | 4/2014 | Kono | B60L 3/0023 701/22 |
| 8,798,832 | B2* | 8/2014 | Kawahara | H01M 10/441 701/22 |
| 9,216,641 | B2* | 12/2015 | Ono | B60K 6/365 |
| 9,360,101 | B2* | 6/2016 | Iwase | B60K 6/383 |
| 9,718,459 | B2* | 8/2017 | Imamura | B60W 20/14 |
| 10,272,905 | B2* | 4/2019 | Vyncke | B60K 25/00 |
| 2004/0084234 | A1* | 5/2004 | Yatabe | B60K 6/365 180/65.235 |
| 2004/0124021 | A1* | 7/2004 | Shirai | B60K 6/365 180/65.25 |
| 2006/0249319 | A1 | 11/2006 | Hoare et al. | |
| 2007/0187159 | A1* | 8/2007 | Lee | B60K 6/365 180/65.25 |
| 2007/0199747 | A1* | 8/2007 | Aoyagi | B60L 58/40 180/65.31 |
| 2008/0036330 | A1* | 2/2008 | Abe | H02K 16/00 310/268 |
| 2009/0025992 | A1 | 1/2009 | Hayashi et al. | |
| 2009/0250280 | A1 | 10/2009 | Abe et al. | |
| 2009/0319139 | A1* | 12/2009 | Kondou | B60W 10/06 701/55 |
| 2010/0023193 | A1* | 1/2010 | Ebuchi | B60K 6/365 701/22 |
| 2010/0029428 | A1* | 2/2010 | Abe | B60K 6/40 475/5 |
| 2010/0219706 | A1 | 9/2010 | Watanabe et al. | |
| 2010/0274427 | A1* | 10/2010 | Ebuchi | B60L 50/16 701/22 |
| 2011/0029179 | A1* | 2/2011 | Miyazaki | B60K 6/46 701/22 |
| 2011/0034282 | A1* | 2/2011 | Akutsu | B60K 6/26 475/5 |
| 2011/0034299 | A1* | 2/2011 | Nakamura | F16H 61/0031 477/167 |
| 2011/0109179 | A1* | 5/2011 | Akutsu | F16H 3/44 310/77 |
| 2011/0109180 | A1* | 5/2011 | Akutsu | B60K 6/448 310/77 |
| 2011/0313607 | A1* | 12/2011 | Checketts | B60T 7/12 701/22 |
| 2011/0313613 | A1* | 12/2011 | Kawahara | H01M 10/441 701/34.4 |
| 2012/0122629 | A1* | 5/2012 | Akutsu | B60L 50/16 477/3 |
| 2012/0179320 | A1* | 7/2012 | Abe | B60K 6/26 701/22 |
| 2012/0194108 | A1* | 8/2012 | Kasaoka | H02K 49/06 318/400.02 |
| 2012/0197475 | A1* | 8/2012 | Akutsu | B60K 6/26 701/22 |
| 2012/0202645 | A1 | 8/2012 | Akutsu et al. | |
| 2012/0203414 | A1* | 8/2012 | Akutsu | B60K 6/26 701/22 |
| 2012/0203415 | A1* | 8/2012 | Akutsu | B60K 6/26 701/22 |
| 2012/0209467 | A1* | 8/2012 | Kono | B60L 3/0023 701/22 |
| 2012/0215389 | A1* | 8/2012 | Perry | B60K 6/48 701/22 |
| 2012/0323430 | A1* | 12/2012 | Nakamura | B60L 50/51 701/22 |
| 2014/0232228 | A1 | 8/2014 | Watanabe et al. | |
| 2014/0277892 | A1 | 9/2014 | Harada et al. | |
| 2014/0336856 | A1* | 11/2014 | Loos | B60L 3/106 701/22 |
| 2014/0343772 | A1* | 11/2014 | Loos | B60T 8/17616 701/22 |
| 2015/0360676 | A1 | 12/2015 | Nakano et al. | |
| 2016/0009185 | A1 | 1/2016 | Sonoda et al. | |
| 2016/0090081 | A1* | 3/2016 | Akita | B60W 20/40 701/22 |

FOREIGN PATENT DOCUMENTS

| | | |
|---|---|---|
| CN | 105143002 A | 12/2015 |
| JP | 2006-315673 A | 11/2006 |
| JP | 2007-261562 A | 10/2007 |
| JP | 2009-073472 A | 4/2009 |
| JP | 2012-081875 A | 4/2012 |
| WO | WO 2011/045963 A1 | 4/2011 |
| WO | WO 2014/136343 A1 | 9/2014 |

OTHER PUBLICATIONS

Dec. 16, 2019, Chinese Office Action issued for related CN Application No. 201810729902.7.

* cited by examiner

POWER APPARATUS

CROSS-REFERENCE TO RELATED APPLICATIONS

The present application claims the benefit of priority of Japanese Patent Application No. 2017-134839, filed on Jul. 10, 2017, the content of which is incorporated herein by reference.

TECHNICAL FIELD

The present invention relates to a power apparatus, in particular to a power apparatus for a hybrid vehicle.

BACKGROUND ART

There has been known a hybrid vehicle including a drive motor and an engine, wherein the engine is started by utilizing torque of the drive motor (see JP-A-2012-081875, for example).

In such a hybrid vehicle, generally, torque for starting the engine is secured as reserve torque during EV travelling by the drive motor. Therefore, an EV travelable range is a torque area obtained by subtracting the reserve torque from the original maximum torque which the drive motor can output.

FIG. 15 is a torque characteristic diagram of a motor in which torque of the motor is shown along a vertical axis and a rotational speed of the motor is shown along a horizontal axis. When the maximum torque of the motor is set to A (Nm) and the maximum output is set to B (kW), and further the starting torque (ENG starting reserve torque) necessary for starting an engine is set to Y (Nm) or the starting output is set to S (kW), an EV travelable range is limited to a region (EV travelable range) where the torque of the motor is A−Y (Nm) or less or the output is B−S (kW).

In recent years, it is required to extend an EV travelable range from the demand for improving fuel efficiency and the like.

SUMMARY

The present invention has been made in view of the circumstances, and an aspect thereof provides a power apparatus capable of extending an EV travelable range while reserve torque for starting an engine is secured.

According to an aspect of the present invention, the following power apparatus is provided. Herein, corresponding elements in embodiments are described in parentheses as an example. However, the configurations are not limited thereto.

(1) A power apparatus (power apparatus 1 or 1A) includes:
  a drive motor (drive motor M) including a drive rotor (drive rotor TR) and a drive stator (drive stator TS) to be disposed to face the drive rotor;
  a drive motor shaft (motor shaft MS) mechanically connected to a wheel of a vehicle and configured to rotate integrally with the drive rotor;
  an engine (engine E);
  an engine output shaft (crankshaft CS) mechanically connected to the drive motor shaft and configured to output torque of the engine;
  a clutch (clutch CL) disposed on a power transmission path between the engine output shaft and the drive motor shaft;
  a controller (controller CTR) configured to start-control the engine with the torque of the drive motor; and
  a magnetic deceleration mechanism (magnetic deceleration mechanism SR) including:
    a deceleration stator (deceleration stator S) configured to generate a rotational magnetic field;
    a first deceleration rotor (first deceleration rotor R1) including a plurality of magnetic pole portions and facing the deceleration stator; and
    a second deceleration rotor (second deceleration rotor R2) including a plurality of soft magnetic portions and provided between the deceleration stator and the first deceleration rotor,
  wherein the magnetic deceleration mechanism is configured to rotate while maintaining a predetermined collinear relationship between a rotational magnetic field speed of the deceleration stator, a rotational speed of the first deceleration rotor, and a rotational speed of the second deceleration rotor by exciting the deceleration stator,
  wherein the second deceleration rotor is mechanically connected to the engine output shaft,
  wherein the first deceleration rotor is shared with the drive rotor, and
  wherein when starting the engine, the controller is configured to make excitation to fix the rotational magnetic field of the deceleration stator in a state where the clutch is released.

(2) In the power apparatus according to (1),
  the first deceleration rotor may include the plurality of predetermined magnetic pole portions aligned in a predetermined direction and have a magnetic pole row arranged such that two adjacent magnetic pole portions have different polarities,
  the deceleration stator may be disposed to face the magnetic pole row and have an armature row which is configured to generate a rotational magnetic field moving in the predetermined direction relative to the magnetic pole row by a plurality of predetermined armature magnetic poles generated in a plurality of armatures,
  the second deceleration rotor may include a plurality of predetermined soft magnetic portions aligned in the predetermined direction at intervals from one another and have a soft magnetic portion row arranged to be located between the magnetic pole row and the armature row, and
  when a number of pole pairs of the first deceleration rotor is set to $\alpha$ and a number of soft magnetic portions of the second deceleration rotor is set to $\beta$ with respect to a number "1" of magnetic pole pairs of the deceleration stator, $\beta=\alpha+1$ may be satisfied, where $\alpha \neq 1$.

According to the magnetic deceleration mechanism, the soft magnetic portion row of the second deceleration rotor is arranged to be located between the magnetic pole row of the first deceleration rotor and the armature row of the deceleration stator which face each other, and a plurality of magnetic poles, armatures, and soft magnetic portions which respectively configure the magnetic pole row, the armature row, and the soft magnetic portion row are arranged in the predetermined direction. In addition, as the electric power is supplied to the armature row, a plurality of armature magnetic poles are generated, and further, a moving magnetic field generated by the armature magnetic poles is generated relative to the magnetic pole row and also moves in the predetermined direction. Furthermore, adjacent two magnetic poles have polarities different from each other and there is a space between two adjacent soft magnetic portions.

As described above, in a portion between the magnetic pole row and the armature row, a moving magnetic field by a plurality of armature magnetic poles is generated and a soft magnetic portion row is arranged, and thus the soft magnetic portion is magnetized by the armature magnetic pole and the magnetic pole. As a result of this and a space between two adjacent soft magnetic portions as described above, magnetic lines of force which connect the magnetic poles, the soft magnetic portion, and the armature magnetic poles are generated. In addition, by the action of the magnetic force by the magnetic lines of force, electric power is supplied to the armature to fix the rotational magnetic field of the deceleration stator, and thus it is possible to lower the rotational speed of the second deceleration rotor with respect to first deceleration rotor.

In this case, for example, when the magnetic deceleration mechanism is configured under the following conditions (a) and (b), the relationship between the moving magnetic field and the speed between the first and second deceleration rotors, and the relationship of the torque between the first and second deceleration rotors and the deceleration stator can be expressed as follows.

(a) The magnetic deceleration mechanism is a rotary and the armature has three phase coils of a U phase, a V phase, and a W phase.

(b) When the number of pole pairs of the first deceleration rotor is set to $\alpha$ and the number of soft magnetic portions of the second deceleration rotor is set to $\beta$ with respect to the number "1" of magnetic pole pairs of the deceleration stator, $\beta=\alpha+1$ is satisfied, where $\alpha\neq 1$.

When $\alpha=2$, the number of magnetic pole pairs of the armature magnetic poles of the deceleration stator is 1, the number of pole pairs of the first deceleration rotor is 2, and the number of soft magnetic portions of the second deceleration rotor is 3. The "magnetic pole pair" and the "pole pair" used in the specification refer to a set of N poles and S poles. In terms of magnetic pole number, when $\alpha=2$, there are two armature magnetic poles of the deceleration stator and four magnetic poles of the first deceleration rotor. FIG. 14 is an equivalent circuit of the magnetic deceleration mechanism when $\alpha=2$.

When a rotational angle of the first deceleration rotor is set to $\theta_1$ and a rotational angle of the second deceleration rotor is set to $\theta_2$, a component of the magnetic flux passing through one soft magnetic portion of the soft magnetic portions and entering one coil is expressed by the following equation.

$$\cos(\alpha(\theta_2 - \theta_1))\cos(\theta_2)$$

When the equation described above is generalized, it is expressed by the following equation.

$$\cos\left(\alpha\left(\theta_2 + n\frac{2\pi}{\beta} - \theta_1\right)\right)\cos\left(\theta_2 + n\frac{2\pi}{\beta}\right); n = 0 \sim \beta - 1$$

When it is totaled for one turn, it is expressed by the following equation.

$$\sum_{n=0}^{\beta-1}\cos\left(\alpha\left(\theta_2 + n\frac{2\pi}{\beta} - \theta_1\right)\right)\cos\left(\theta_2 + n\frac{2\pi}{\beta}\right) =$$

-continued $$\frac{1}{2}\beta\cos((\alpha+1)\theta_2 - \alpha\theta_1) + \frac{1}{2}\cos((\alpha-1)\theta_2 - \alpha\theta_1)\sum_{n=0}^{\beta-1}\cos\left((\alpha-1)\frac{2\pi}{\beta}n\right) +$$

$$\frac{1}{2}\cos((\alpha-1)\theta_2 - \alpha\theta_1)\sum_{n=0}^{\beta-1}\sin\left((\alpha-1)\frac{2\pi}{\beta}n\right) =$$

$$\frac{1}{2}(\alpha+1)\cos((\alpha+1)\theta_2 - \alpha\theta_1)$$

From the above, the amount of magnetic flux passing through each phase is expressed by the following equation with a rotor flux $\psi_f$.

$$\begin{cases} \Psi_u = \frac{\alpha+1}{2\alpha}\psi_f\cos((\alpha+1)\theta_2 - \alpha\theta_1) \\ \Psi_v = \frac{\alpha+1}{2\alpha}\psi_f\cos\left((\alpha+1)\theta_2 - \alpha\theta_1 - \frac{2}{3}\pi\right) \\ \Psi_w = \frac{\alpha+1}{2\alpha}\psi_f\cos\left((\alpha+1)\theta_2 - \alpha\theta_1 - \frac{4}{3}\pi\right) \end{cases}$$

When an angle·angular velocity of the stator field magnet is set to $\theta_S \cdot \omega_S$, it is expressed by the following equation.

$$\theta_s = (\alpha+1)\theta_2 - \alpha\theta_1$$
$$\omega_s = (\alpha+1)\omega_2 - \alpha\omega_1$$

Therefore, a voltage equation of induced power is expressed by the following equation.

$$\begin{cases} \frac{d\Psi_u}{dt} = \frac{\alpha+1}{2\alpha}\psi_f\omega_s\sin\theta_s \\ \frac{d\Psi_v}{dt} = \frac{\alpha+1}{2\alpha}\psi_f\omega_s\sin\left(\theta_s - \frac{2}{3}\pi\right) \\ \frac{d\Psi_w}{dt} = \frac{\alpha+1}{2\alpha}\psi_f\omega_s\sin\left(\theta_s + \frac{2}{3}\pi\right) \end{cases}$$

In this case, applied current is expressed by the following equation.

$$\begin{cases} I_u = I\sin\theta_s \\ I_v = I\sin\left(\theta_s - \frac{2}{3}\pi\right) \\ I_w = I\sin\left(\theta_s + \frac{2}{3}\pi\right) \end{cases}$$

Applied voltage is expressed by the following equation.

$$W = \frac{d\Psi_u}{dt}I_u + \frac{d\Psi_v}{dt}I_v + \frac{d\Psi_w}{dt}I_w$$
$$= \frac{\alpha+1}{2\alpha}\psi_f I\omega_s\left\{\sin^2\theta_s + \sin^2\left(\theta_s - \frac{2}{3}\pi\right) + \sin^2\left(\theta_s + \frac{2}{3}\pi\right)\right\}$$
$$= \frac{\alpha+1}{4\alpha}\psi_f I\omega_s$$

From the relationship between the input and the output of the magnetic deceleration mechanism, the following equation is derived. $T_1$ is the torque of the first deceleration rotor, $T_2$ is the torque of the first deceleration rotor, $\omega_1$ is the angular velocity of the first deceleration rotor, and $\omega_2$ is the angular velocity of the second deceleration rotor.

$$W + T_1\omega_1 + T_2\omega_2 = 0$$

$$\frac{\alpha+1}{4\alpha}\psi_f I((\alpha+1)\omega_2 - \alpha\omega_1) + T_1\omega_1 + T_2\omega_2 = 0$$

$$\left(T_2 + \frac{(\alpha+1)^2}{4\alpha}\psi_f I\right)\omega_2 + \left(T_1 - \frac{\alpha+1}{4}\psi_f I\right)\omega_1 = 0$$

From this, the following equation is derived.

$$T_1 = \frac{\alpha+1}{4}\psi_f I$$

$$T_2 = -\frac{(\alpha+1)^2}{4\alpha}\psi_f I$$

When an equivalent torque of the stator field magnetism is expressed by $$T_s = \frac{\alpha+1}{4\alpha}\psi_f I$$

the following equation is derived.

$$\begin{cases} \omega_s = (1+\alpha)\omega_2 - \alpha\omega_1 \\ T_s = \frac{1}{\alpha}T_1 = -\frac{1}{1+\alpha}T_2 \end{cases}$$

The relationship of the electrical angular velocity and the relationship of the torque are the same as the relationship between the rotational speed and the torque in a sun gear, a ring gear, and a carrier of the planetary gear device. The relationship of the electrical angular velocity and the relationship of the torque are not limited to the case where the stator described above is made immovable but is established under the condition of permission of movement of every first and second deceleration rotors and deceleration stators. In the invention, by using the magnetic deceleration mechanism, harmonic vibration components generated in the mechanical deceleration mechanism are not transmitted to the wheels, and thus vibration characteristics are improved.

(3) in the power apparatus according to (1) or (2),
the deceleration stator, the first deceleration rotor, and the second deceleration rotor may face one another in a radial direction.

(4) In the power apparatus according to (1) or (2)
the deceleration stator, the first deceleration rotor, and the second deceleration rotor may face one another in an axial direction.

(5) In the power apparatus (power apparatus 1B or 1C) according to any one of (1) to (4),
in the drive motor, the drive rotor may be disposed to face a radially inner side of the drive stator, and
the magnetic pole portion of the first deceleration rotor of the magnetic deceleration mechanism may include magnets arranged in a circumferential direction on an inner circumferential portion of the drive rotor of the drive motor.

(6) A power apparatus (power apparatus 1 to 1C) includes:
a drive motor (drive motor M) including a drive rotor (drive rotor TR) and a drive stator (drive stator TS) to be disposed to face the drive rotor;
a drive motor shaft (motor shaft MS) mechanically connected to a wheel of a vehicle and configured to rotate integrally with the drive rotor;
an engine (engine E);
an engine output shaft (crankshaft CS) mechanically connected to the drive motor shaft and configured to output torque of the engine;
a clutch (clutch CL) disposed on a power transmission path between the engine output shaft and the drive motor shaft;
a controller (controller CTR) configured to start-control the engine with the torque of the drive motor; and
a magnetic deceleration mechanism including:
  a first deceleration stator shared with the drive stator of the drive motor;
  a second deceleration stator configured to generate a rotational magnetic field; and
  a deceleration rotor including a plurality of soft magnetic portions and provided between the first deceleration stator and the second deceleration stator,
wherein the magnetic deceleration mechanism being configured to rotate while maintaining a predetermined collinear relationship between a rotational magnetic field speed of the second deceleration stator, a rotational magnetic field speed of the first deceleration stator and a rotational speed of the deceleration rotor by exciting the second deceleration stator,
wherein the deceleration rotor is mechanically connected to the engine output shaft, and
wherein when starting the engine, the controller is configured to make excitation to fix the rotational magnetic field of the second deceleration stator in a state where the clutch is released.

(7) In the power apparatus according to (6),
the second deceleration stator may be arranged to face an armature row of the first deceleration stator and have an armature row which is configured to generate a rotational magnetic field moving in a predetermined direction with the armature row of the first deceleration stator by a plurality of predetermined armature magnetic poles generated in a plurality of armatures.
the deceleration rotor may include the plurality of predetermined soft magnetic portions aligned in the predetermined direction at intervals from one another and have a soft magnetic portion row arranged to be located between the armature row of the first deceleration stator and the armature row of the second deceleration stator, and
when a number of magnetic pole pairs of the first deceleration stator is set to $\alpha$ and a number of soft magnetic portions of the deceleration rotor is set to $\beta$ with respect to the number "1" of magnetic pole pairs of the second deceleration stator, $\beta=\alpha+1$ may be satisfied, where $\alpha \neq 1$.

According to the magnetic deceleration mechanism, the soft magnetic part row of the deceleration rotor is arranged to be located between the armature rows of the first deceleration stator and the armature row of the second deceleration stator which face each other, a plurality of armatures of the first deceleration stator, the armatures and the soft magnetic portions of the second deceleration stator which respectively configure the armature row of the first deceleration stator and the armature row and the soft magnetic portion row of the second deceleration stator are aligned in the predetermined direction. Further, a plurality of armature magnetic poles are generated as electric power is supplied to the armature row of the second deceleration stator and the moving magnetic field by those armature magnetic poles is generated relative to the armature row of the first deceleration stator and moves in the predetermined direction. Furthermore, there is a space between two adjacent soft magnetic portions. As described above, since a moving magnetic field is generated by a plurality of armature magnetic poles and the soft magnetic portion row is arranged between the armature row of the first deceleration stator and the armature row of the second deceleration stator, the soft magnetic portion is magnetized by the armature magnetic poles of the first deceleration stator and the armature magnetic poles of the second deceleration stator. Due to the fact described above and the fact that there is a space between two adjacent soft magnetic portions as described above, magnetic lines of force are generated that connect the armature magnetic poles of the first deceleration stator and the soft magnetic parts and the armature magnetic poles of the second deceleration stator. Also, by the action of the magnetic force caused by the magnetic line of force, electric power is supplied to the armature to fix the rotational magnetic field of the second deceleration stator, so that it is possible to lower the rotational speed of the deceleration rotor with respect to the drive rotor rotating with the rotational magnetic field of the first deceleration stator.

Although a detailed explanation will be omitted, in the magnetic deceleration mechanism, the following equation is derived when $T_{S1}$ is the equivalent torque of the stator field magnetism of the first deceleration stator, $T_{S2}$ is the equivalent torque of the stator field magnetism of the second deceleration stator, $T_R$ is the torque of the deceleration rotor, $\omega_{S1}$ is the angular velocity of the stator field magnetism of the first deceleration stator, $\omega_{S2}$ is the angular velocity of the stator field magnetism of the second deceleration stator, and $\omega_R$ is the angular velocity of the deceleration rotor.

$$\begin{cases} \omega_{s1} = (1+\alpha)\omega_R - \alpha\omega_{s2} \\ T_{s1} = \frac{1}{\alpha}T_{s2} = -\frac{1}{1+\alpha}T_R \end{cases}$$

The relationship of the electrical angular velocity and the relationship of the torque are also the same as the relationship between the rotational speed and the torque in a sun gear, a ring gear, and a carrier of the planetary gear device.

(8) In the power apparatus according to (6) or (7), the second deceleration stator, the first deceleration stator, and the deceleration rotor may face one another in a radial direction.

(9) In the power apparatus according to (6) or (7), the second deceleration stator, the first deceleration stator, and the deceleration rotor may face one another in an axial direction.

(10) A power apparatus (power apparatus 1 to 1C) includes:
   a drive motor (drive motor M) including a drive rotor (drive rotor TR) and a drive stator (drive stator TS) to be disposed to face the drive rotor;
   a drive motor shaft (motor shaft MS) mechanically connected to a wheel of a vehicle and configured to rotate integrally with the drive rotor;
   an engine (engine E);
   an engine output shaft (crankshaft CS) mechanically connected to the drive motor shaft and configured to output torque of the engine;
   a clutch (clutch CL) disposed on a power transmission path between the engine output shaft and the drive motor shaft;
   a controller (controller CTR) configured to start-control the engine with torque of the drive motor; and
   a magnetic deceleration mechanism (magnetic deceleration mechanism SR) configured to reduce torque of the drive motor necessary for starting the engine by magnetically reducing a rotational speed of the engine output shaft during a start control,
   wherein when starting the engine, the controller is configured to excite the magnetic deceleration mechanism in a state where the clutch is released.

According to the power apparatus of (1), it is possible to lower the rotational speed at the start of the engine by making excitation to fix the rotational magnetic field of the deceleration stator of the magnetic deceleration mechanism in a state where the clutch is released at the start of the engine. Therefore, the torque of the drive motor necessary for starting the engine can be lowered, and thus it is possible to reduce reserve torque which cannot be used for the start of the engine. Thus, it is possible to extend the EV travelling region.

Further, a harmonic vibration component generated in the mechanical deceleration mechanism is not transmitted to the drive wheel by using the magnetic deceleration mechanism, and thus vibration characteristics are improved.

According to the power apparatus of (2), when the number of pole pairs of the first deceleration rotor is set to $\alpha$ and the number of soft magnetic portions of the second deceleration rotor is set to $\beta$ with respect to the number "1" of magnetic poles pairs of the deceleration stator, $\beta=\alpha+1$ ($\alpha\neq 1$) is satisfied. Therefore, a predetermined collinear relationship is established between the rotational magnetic field speed of the deceleration stator, the rotational speed of the first deceleration rotor, and the rotational speed of the second deceleration rotor.

According to the power apparatus of (3), the deceleration stator, the first deceleration rotor, and the second deceleration rotor face one another in the radial direction, and thus the magnetic deceleration mechanism can be configured by a radial motor.

According to the power apparatus of (4), the deceleration stator, the first deceleration rotor, and the second deceleration rotor face one another in the axial direction, and thus the magnetic deceleration mechanism can be configured by an axial motor.

According to the power apparatus of (5), the magnetic pole portion of the first deceleration rotor of the deceleration mechanism includes a plurality of magnets aligned in the circumferential direction on the inner circumferential portion of the drive rotor, and thus it is shared with the drive rotor of the drive motor.

According to the power apparatus of (6), excitation is performed to fix the rotational magnetic field of the second deceleration stator of the magnetic deceleration mechanism in a state where the clutch is released at the start of the engine, so that the rotational speed at the start of the engine can be lowered. Therefore, the torque of the drive motor necessary for starting the engine can be lowered, so that it is possible to reduce the reserve torque which cannot be used for the start of the engine, and thus it is possible to extend the EV travelling region.

Further, a harmonic vibration component generated in the mechanical deceleration mechanism is not transmitted to the drive wheel by using the magnetic deceleration mechanism, and thus vibration characteristics are improved.

According to the power apparatus of (7), when the number of magnetic pole pairs of the first deceleration rotor is set to $\alpha$ and the number of soft magnetic portions of the deceleration rotor is set to $\beta$ with respect to the number "1" of magnetic poles pairs of the second deceleration stator, $\beta=\alpha+1$ ($\alpha \neq 1$) is satisfied. Therefore, a predetermined collinear relationship is established between the rotational magnetic field speed of the second deceleration stator, the rotational magnetic field speed of the first deceleration rotor, and the rotational speed of the deceleration rotor.

According to the power apparatus of (8), the second deceleration stator, the first deceleration rotor, and the deceleration rotor face one another in the radial direction, and thus the magnetic deceleration mechanism can be configured by a radial motor.

According to the power apparatus of (9), the second deceleration stator, the first deceleration rotor, and the deceleration rotor face one another in the axial direction, and thus the magnetic deceleration mechanism can be configured by an axial motor.

According to the power apparatus of (10), the magnetic deceleration mechanism is excited in a state where the clutch is released at the start of the engine, so that the rotational speed at the start of the engine can be lowered. Therefore, the torque of the drive motor necessary for starting the engine can be lowered, so that it is possible to reduce the reserve torque which cannot be used for the start of the engine so far, and thus it is possible to extend the EV travelling region.

Further, a harmonic vibration component generated in the mechanical deceleration mechanism is not transmitted to the drive wheel by using the magnetic deceleration mechanism, and thus vibration characteristics are improved.

DETAILED DESCRIPTION OF EMBODIMENT

Embodiments of the invention will be specifically described with reference to the drawings.

First Embodiment

Figure 1:
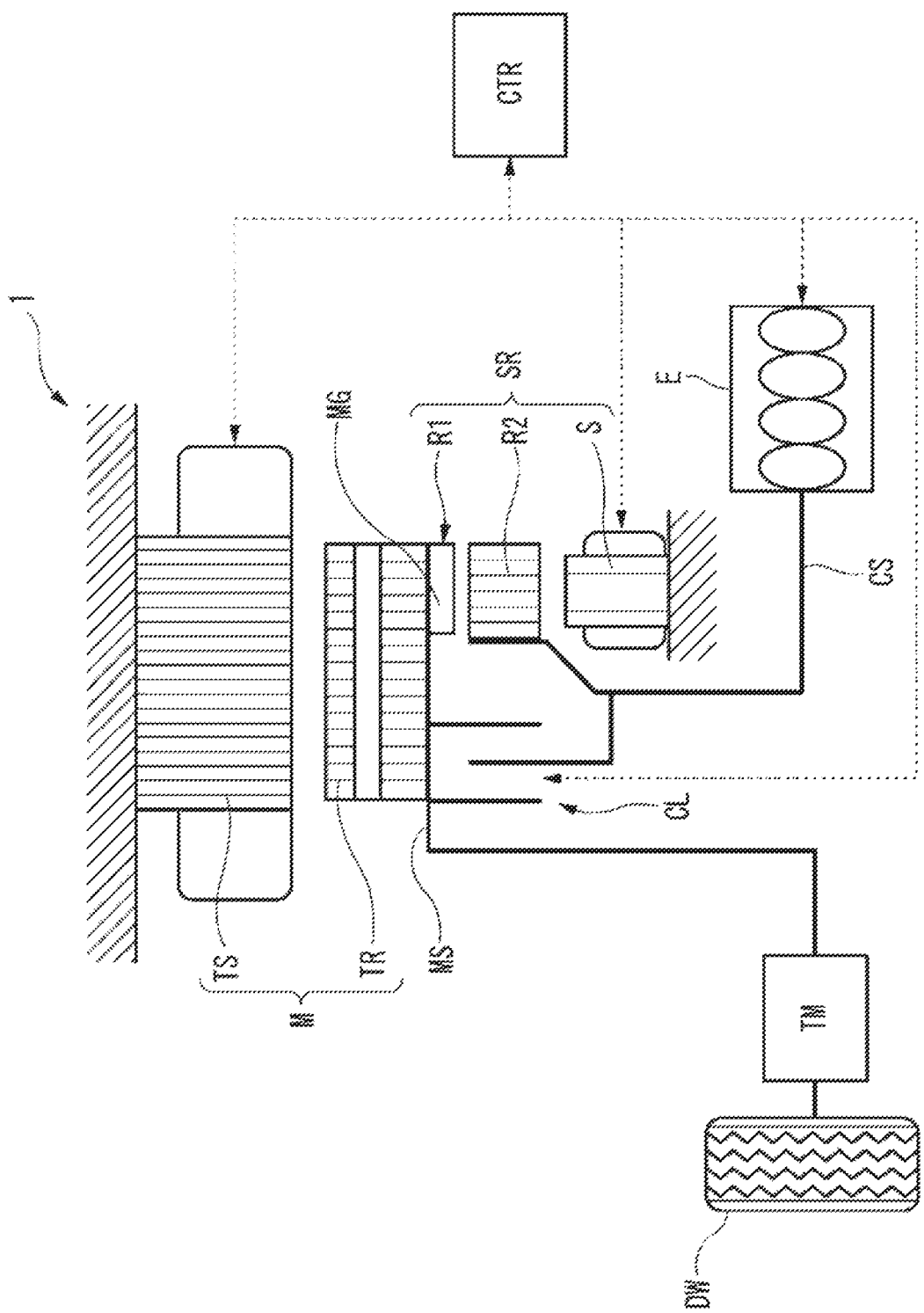
FIG. 1 is a schematic configuration diagram of a power apparatus according to a first embodiment of the invention.

FIG. 1 is a schematic configuration diagram of a power apparatus according to a first embodiment of the invention. The power apparatus 1 is for driving a drive wheel DW of a vehicle (not shown) and includes a drive motor M and an engine E as driving sources, a transmission TM disposed on a power transmission path between the drive motor M and the engine E, and the drive wheel DW, a clutch CL disposed on a power transmission path between the drive motor M and the engine E, a magnetic deceleration mechanism SR, and a controller CTR.

The drive motor M is a three-phase alternating inner rotor type motor including a drive rotor TR in which a magnet is disposed and a drive stator TS disposed to face the outer diameter side of the drive rotor TR. A motor shaft MS rotating integrally with the drive rotor TR is attached to the drive rotor TR, and the motor shaft MS is connected to the drive wheel DW via the transmission TM.

A clutch CL is disposed on a power transmission path between motor shaft MS of the drive motor M and a crankshaft CS of the engine E, and the clutch CL shuts off a mechanical power transmission between the drive motor M and the engine E by releasing and permits a mechanical power transmission between the drive motor M and the engine E by engagement.

The magnetic deceleration mechanism SR includes a deceleration stator S on which excitation coil is wound and which generates rotational magnetic field, a first deceleration rotor R1 which is arranged to face an outer diameter side of the deceleration stator S, and a second deceleration rotor R2 which is provided between the deceleration stator S and the first deceleration rotor R1.

The first deceleration rotor R1 is shared with the drive rotor TR of the drive motor M, and a plurality of magnets MG are arranged in the circumferential direction on an inner peripheral surface of one axial end portion (right end portion in FIG. 1) of the drive rotor TR. The magnets MG are arranged such that the adjacent magnets MG have mutually different polarities to configure a magnetic pole row.

The deceleration stator S is disposed to face the magnetic pole row of the first deceleration rotor R1 in the radial direction at one axial end portion (right end portion in FIG.

1) of the drive rotor TR, and the deceleration stator S has an armature row which generates a rotational magnetic field moving in the circumferential direction relative to a magnetic pole row by a plurality of armature magnetic poles generated in a plurality of armatures.

The second deceleration rotor R2 includes a plurality of soft magnetic portions arranged in the circumferential direction at intervals from one another. Further, the second deceleration rotor R2 has a soft magnetic portion row arranged to be located between the magnetic pole row of the first deceleration rotor R1 and the armature row of the deceleration stator S and is mechanically connected to the crankshaft CS of the engine E.

Figure 2:
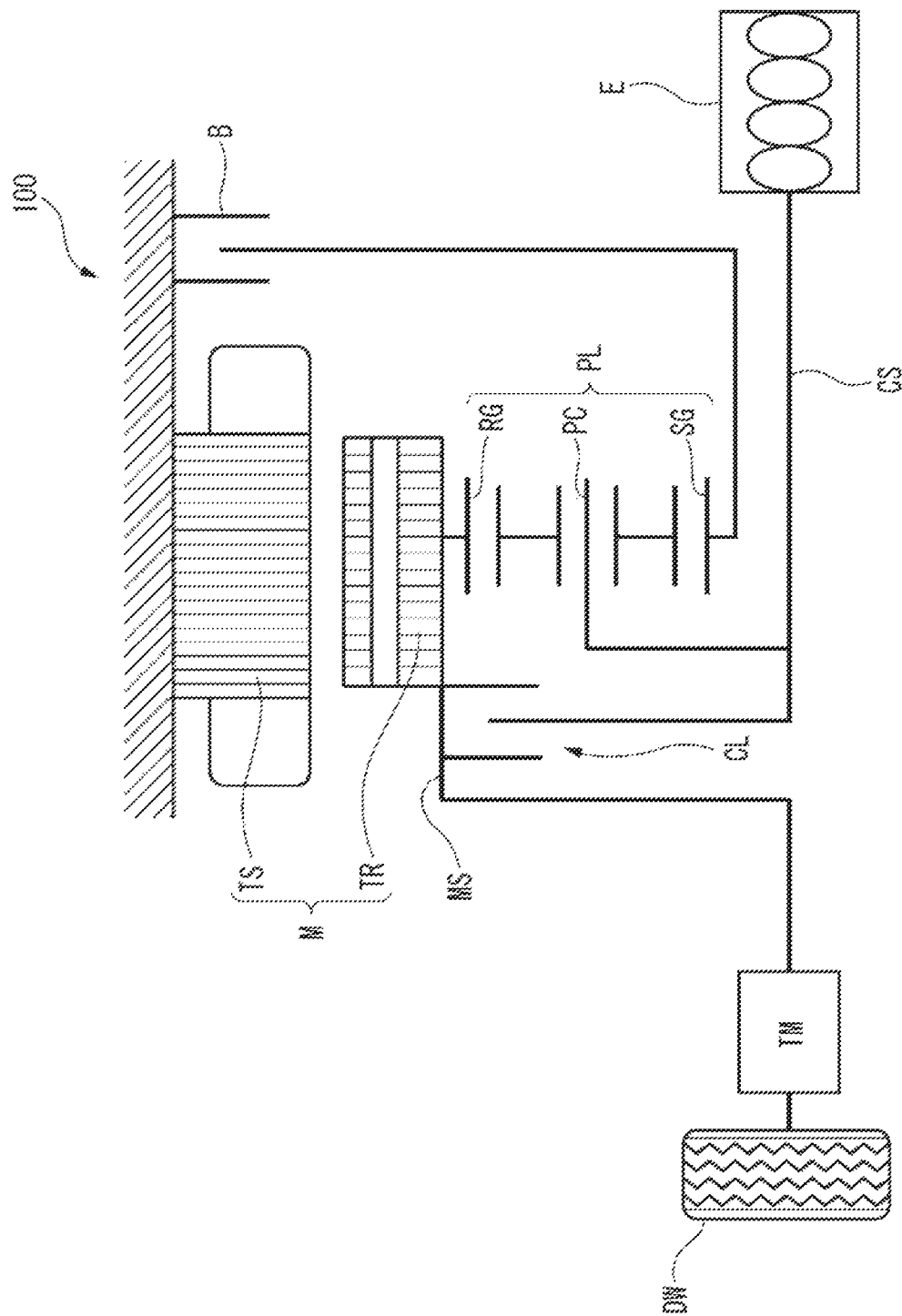
FIG. 2 is a schematic configuration diagram of a power apparatus including a planetary gear mechanism and having the same operating characteristics as those of the power apparatus of FIG. 1.

When the number of pole pairs of the first deceleration rotor R1 is set to $\alpha$ and the number of soft magnetic portions of the second deceleration rotor R2 is set to $\beta$ with respect to the number "1" of magnetic poles pairs of the deceleration stator S, the magnetic deceleration mechanism SR is set to satisfy $\beta=\alpha+1$, where $\alpha\neq1$. Therefore, as described above, the magnetic deceleration mechanism SR illustrated in FIG. 1 has the same operating characteristics as those of a power apparatus 100 including a planetary gear mechanism PL illustrated in FIG. 2.

That is, even when the deceleration stator S capable of fixing the rotational magnetic field of the magnetic deceleration mechanism SR is replaced with a sun gear SG of the planetary gear mechanism which can be fixed by a brake B, the first deceleration rotor R1 of the magnetic deceleration mechanism SR is replaced with a ring gear RG of the planetary gear mechanism, and the second deceleration rotor R2 of the magnetic deceleration mechanism SR is replaced with a planetary carrier PC of the planetary gear mechanism, the same operating characteristics can be obtained.

Figure 3:
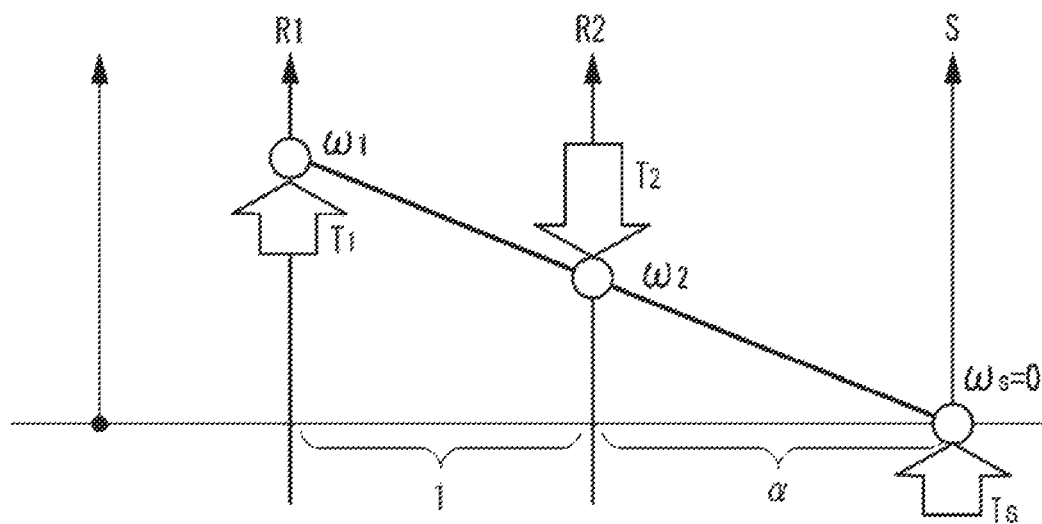
FIG. 3 is a collinear diagram of a magnetic deceleration mechanism incorporate in the power apparatus of FIG. 1.

In the magnetic deceleration mechanism SR, when the deceleration stator S is excited, a field magnetic rotational speed $\omega_S$ of the rotational magnetic field of the deceleration stator S, an angular velocity $\omega_1$ of the first deceleration rotor R1 and an angular velocity $\omega_2$ of the second deceleration rotor R2 satisfy the collinear relationship, as illustrated in a collinear diagram of FIG. 3. In the present specification, the collinear diagram is a diagram illustrating the relationship of the electrical angular velocity between the respective rotary elements and the distance from a horizontal line indicating a value 0 to a black circle on a vertical line represents the electrical angular velocity of each rotary element. Further, the collinear relationship means that the electrical angular velocities of the respective rotary elements are arranged on a single straight line.

As illustrated in FIG. 3, when the rotational magnetic field of the deceleration stator S is fixed, that is, it is excited such that the field magnetic rotational speed $\omega_S$ of the rotational magnetic field of the deceleration stator S becomes zero, from the collinear relationship, the angular velocity $\omega_2$ of the second deceleration rotor R2 drops with respect to the angular velocity $\omega_1$ of the first deceleration rotor R1. Further, torque $T_1$ ($T_1<T_2$) which acts on the first deceleration rotor R1 when the second deceleration rotor R2 is rotated in accordance with a speed ratio is also reduced. Exciting to fix the rotational magnetic field of the deceleration stator S of the magnetic deceleration mechanism SR has the same effect as engaging the brake B in the power apparatus 100 including the planetary gear mechanism PL illustrated in FIG. 2 and fixing the sun gear SG.

When the deceleration stator S is not excited, the deceleration stator S, the first deceleration rotor R1, and the second deceleration rotor R2 are not synchronized, and thus the collinear relationship is not established.

The controller CTR performs rotational magnetic field control of the drive motor M, ignition control of the engine E, torque control, release/engagement control of the clutch CL, rotational magnetic field control of the deceleration stator S of magnetic deceleration mechanism SR, and the like.

In the power apparatus 1 configured as described above, when the clutch CL is engaged and the engine E is driven, the torque of the engine E is transmitted from the crankshaft CS to the drive wheel DW via the clutch CL and the transmission TM, and thus engine traveling is realized. In this case, when the drive motor M is driven, it is possible to perform motor assist traveling.

Further, when the engine E is stopped and the drive motor M is driven in a state where the clutch CL is released, the torque of the drive motor M is transmitted from the motor shaft MS to the drive wheel DW via the transmission TM, and thus EV travelling is realized.

Next, engine start control for starting the engine E with the torque of the drive motor M during EV travelling will be described with reference to FIGS. 4 to 9.

Figure 6:
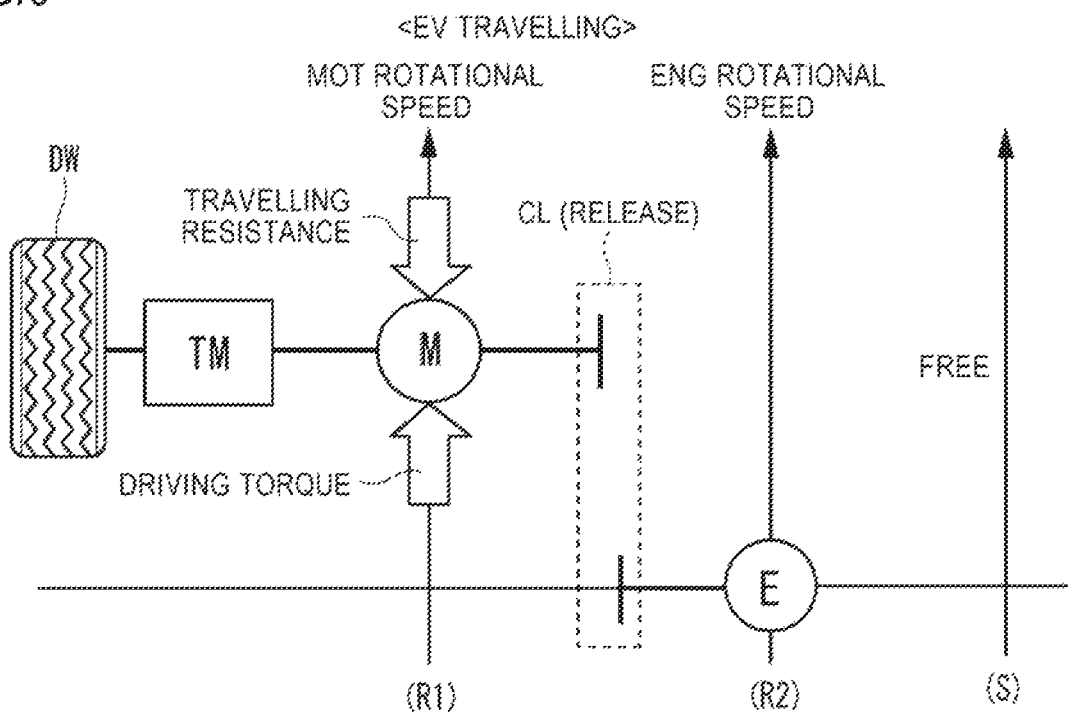
FIG. 6 is a schematic diagram which schematically illustrates the relationship between a rotational speed and torque of a motor and an engine of the power apparatus during EV traveling.

During EV travelling, the clutch CL is released while EV travelling is performed as described above and the engine E is stopped. Therefore, as illustrated in FIG. 6, the drive motor M rotates at a predetermined rotational speed independent of the engine E and the travelling resistance acting via the drive wheel DW and the torque (drive torque) of the drive motor M are balanced.

Figure 4:
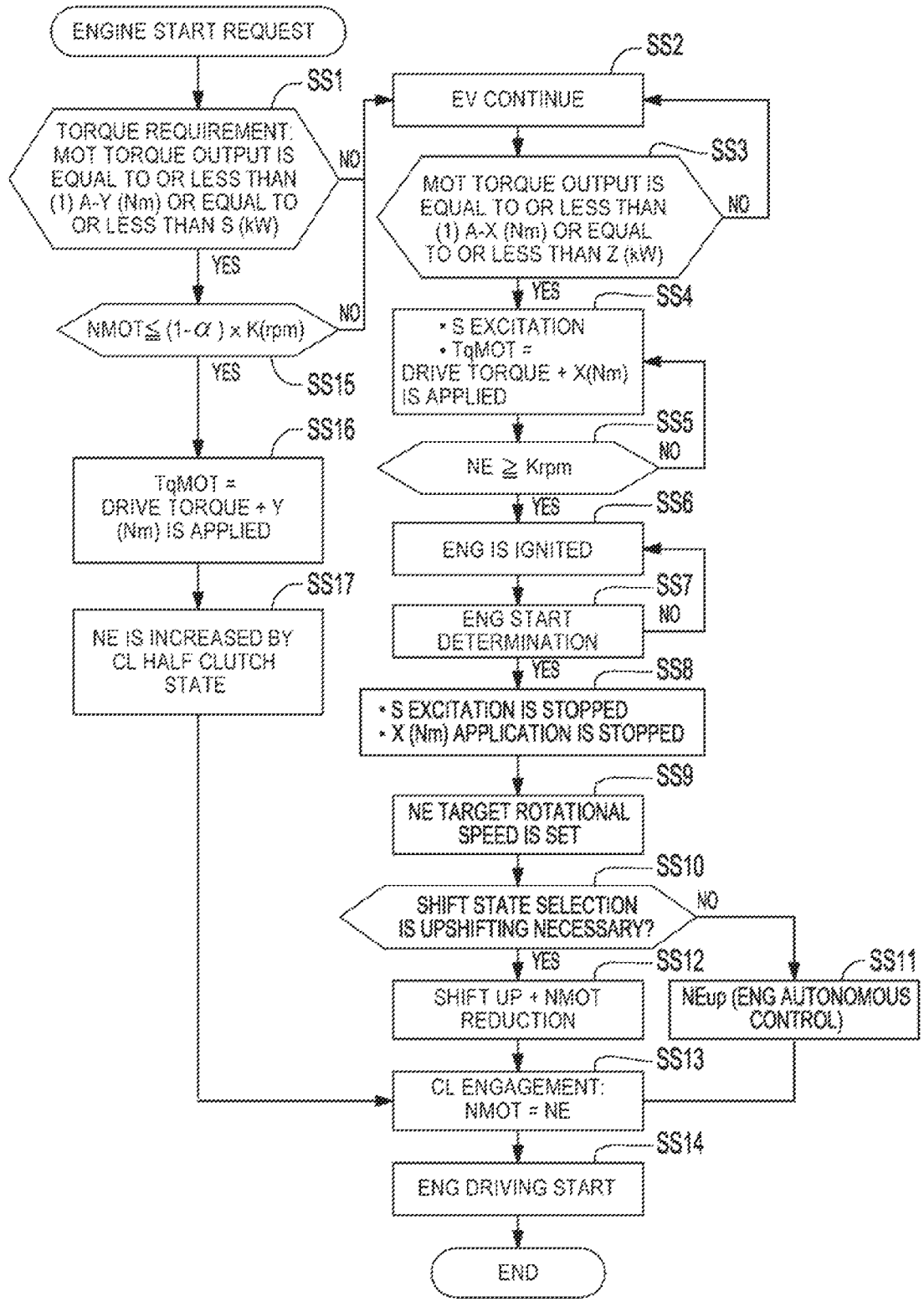
FIG. 4 is a flowchart of an engine start control.
Figure 5:
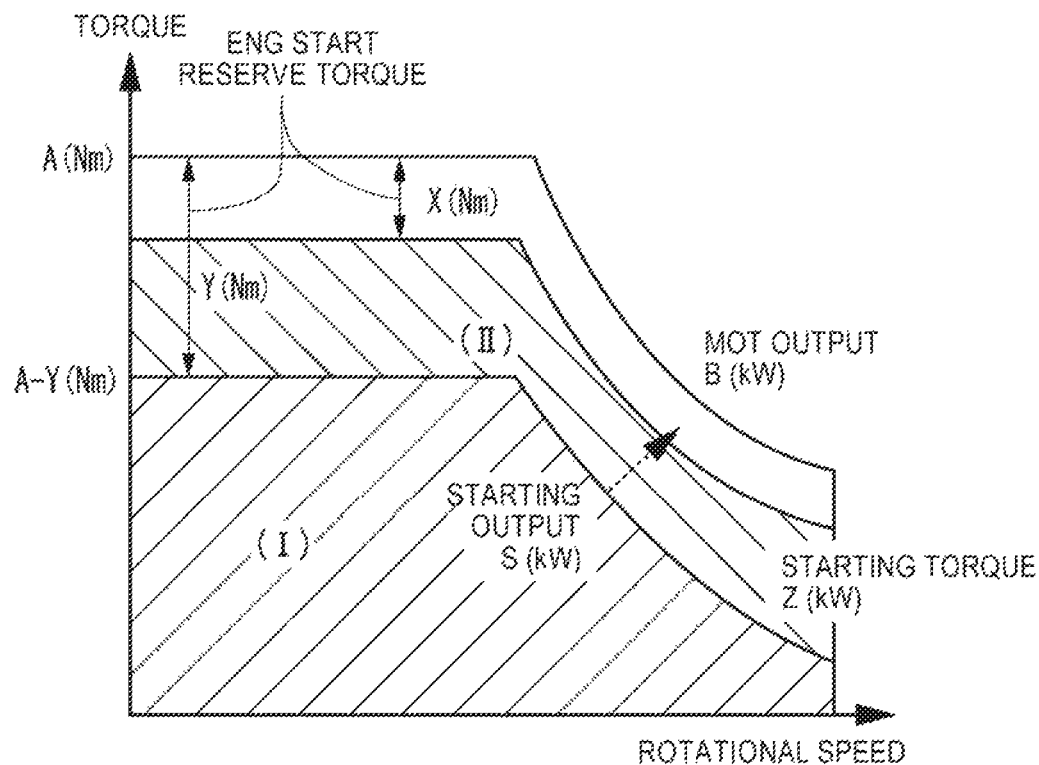
FIG. 5 is a torque characteristic diagram of a drive motor.

As illustrated in FIG. 4, when there is a request to start the engine E, first, it is determined whether required torque or required output of the drive motor M is equal to or less than A−Y (Nm) or equal to or less than S (kW), that is, it is determined whether the driving force requirement of the drive motor M is within the range of a region (I) of the torque characteristic diagram of FIG. 5 (Step SS1). The area (I) is an area which has a margin for outputting Y (Nm) or S (kW) as starting torque or starting output with respect to the maximum torque A (Nm) or the maximum output B (kW) of the motor.

In Step SS1, when the required torque or the required output of the drive motor M is not equal to or less than A−Y (Nm) or equal to or less than S (kW), that is, it is out of the range of the region (I) of the torque characteristic diagram of FIG. 5, EV travelling is continued (Step SS2).

Next, it is determined whether the required torque or the required output of the drive motor M is equal to or less than A−X (Nm) or equal to or less than Z (kW), that is, it is within the range of a region (II) of the torque characteristic chart of FIG. 5 (Step SS3). The region (II) is a region where only X (Nm) (X<Y) or Z (kW) (Z<S) can be outputted as the starting torque or the starting output with respect to the maximum torque A (Nm) or the maximum output B (kW) of the motor.

In Step SS3, when the required torque or the required output of the drive motor M is equal to or less than A−X (Nm) or equal to or less than Z (kW), that is, it is within the range of the region (II) of the torque characteristic diagram of FIG. 5, it is excited to fix the rotational magnetic field of the deceleration stator S of the magnetic deceleration mechanism SR and the starting torque X (Nm) is applied to the drive motor M in addition to the driving torque (Step SS4). As described above (see FIG. 3), in the magnetic deceleration mechanism SR, the rotating magnetic field of the deceleration stator S is fixed and the angular velocity $\omega_2$ of the second deceleration rotor R2 drops with respect to the angular velocity $\omega_1$ of the first deceleration rotor R1.

Figure 7:
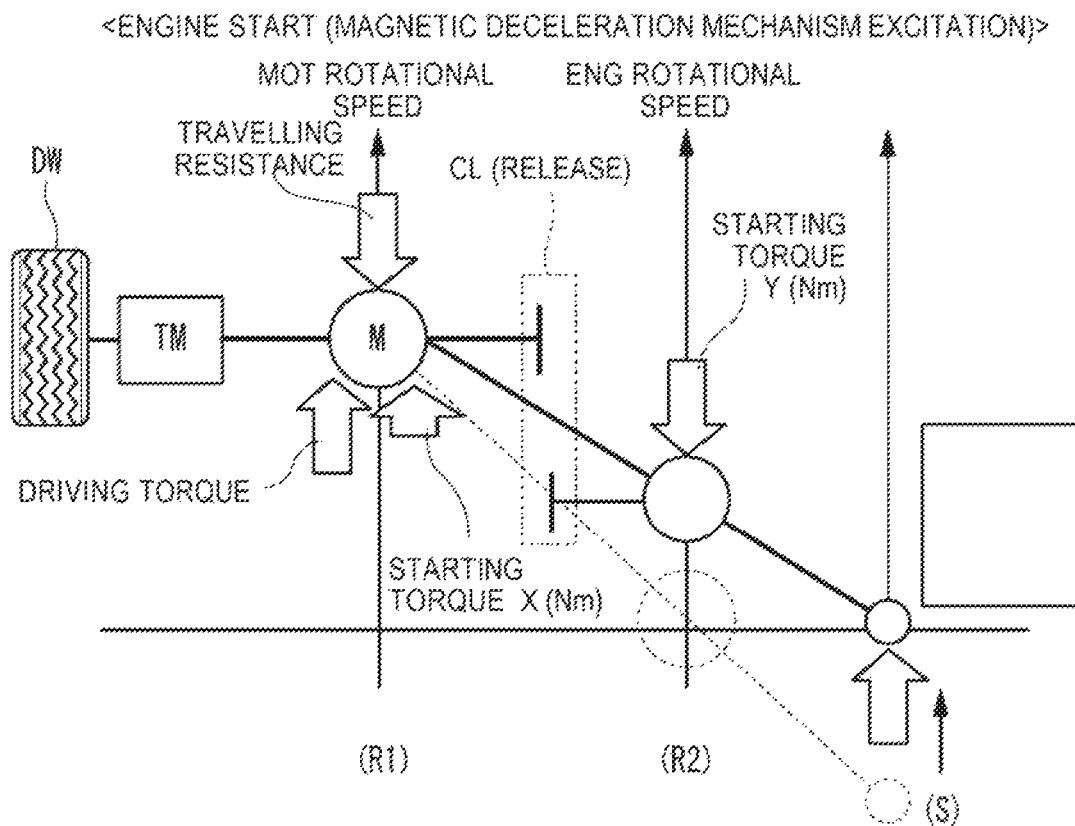
FIG. 7 is a schematic diagram which schematically illustrates the relationship between the rotational speed and torque of the motor and the engine of the power apparatus at the time of engine start (magnetic deceleration mechanism excitation).
Figure 8:
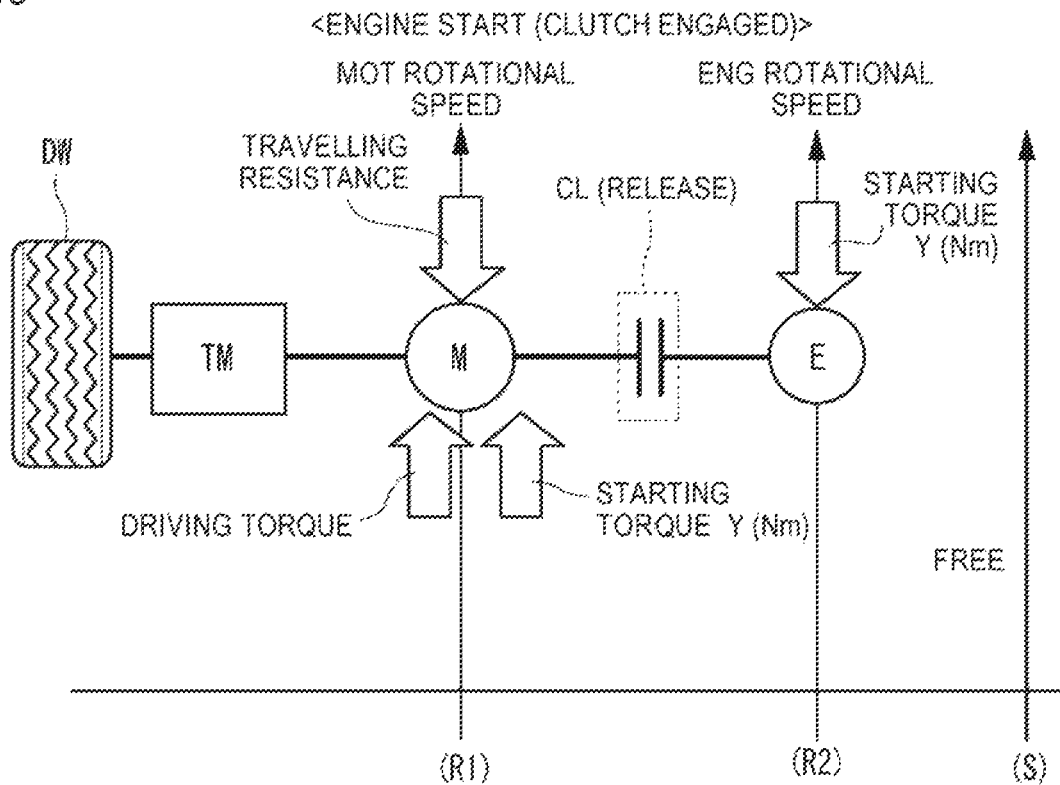
FIG. 8 is a schematic diagram which schematically illustrates the relationship between the rotational speed and torque of the motor and the engine of the power apparatus at the time of engine start (clutch engagement).

Therefore, as illustrated in FIG. 7, the rotational speed of the crankshaft CS (engine E) connected to the second deceleration rotor R2 decreases with respect to the rotational speed of the drive rotor TR (drive motor M) shared with the first deceleration rotor R1, and thus the starting torque of the drive motor M required to start the engine E also decreases. That is, as illustrated in FIG. 8, when the engine E is started by engaging the clutch CL without exciting the deceleration stator S of the magnetic deceleration mechanism SR, the starting torque of the drive motor M required to start engine E is required by Y (Nm). However, the starting torque of the drive motor M necessary to start the engine E is sufficient for X (Nm) by exciting to fix the rotational magnetic field of the deceleration stator S of the magnetic deceleration mechanism SR. In other words, it is possible to start the engine E with the torque of the drive motor M even when EV traveling is permitted to the region (II) beyond the region (I) of the torque characteristic diagram of FIG. 5.

In Step SS3, when the required torque or the required output of the drive motor M is not equal to or less than A–X (Nm) or equal to or less than Z (kW), that is, it is out of the range of the region (I) and the region (II) of the torque characteristic diagram of FIG. 5, the drive motor M cannot output the starting torque X (Nm) necessary to start the engine E even when it is excited to fix the rotational magnetic field of the deceleration stator S of the magnetic deceleration mechanism SR, and thus EV travelling is continued.

In Step SS4, the deceleration stator S of the magnetic deceleration mechanism SR is excited and the starting torque X (Nm) is applied to the drive motor M in addition to the driving torque, and then it is determined whether the a rotational speed NE of the engine E is equal to or greater than the minimum starting rotational speed Krpm (Step SS5). As a result, when the engine speed NE of the engine E is equal to or greater than the minimum starting rotational speed Krpm, the engine E is ignited (burned in) (Step SS6). Then, the start of the engine E is confirmed (Step SS7) and, when the start of the engine E is confirmed, the excitation of the deceleration stator S is stopped and the application of the starting torque X (Nm) to the drive motor M is stopped (Step SS8).

Subsequently, a target rotational speed NE of the engine E is set (Step SS9) and a shift stage of the transmission TM is selected, and further it is determined whether it is necessary to shift up (Step SS10). When the target rotational speed of the engine E is greater than the rotational speed at the start of engine E by more than a predetermined level, if the clutch CL is engaged without upshifting transmission TM, the engine raises revolutions abruptly, and thus the necessity of upshifting is determined in Step SS10.

Figure 9:
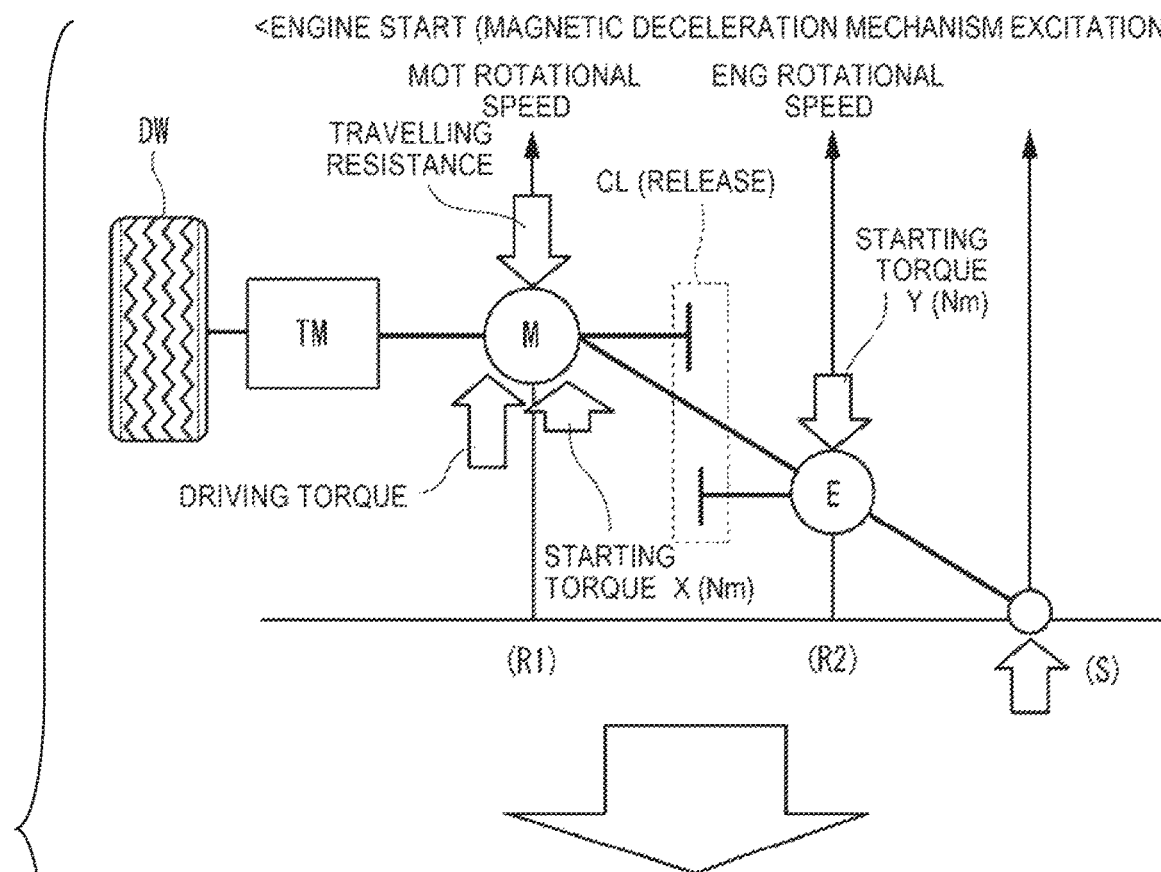
FIG. 9 is a schematic diagram which schematically illustrates the relationship between the rotational speed and torque of the motor and the engine of the power apparatus at the time of transition from engine starting (magnetic deceleration mechanism excitation) to engine traveling (with the motor assist).
Figure 9:
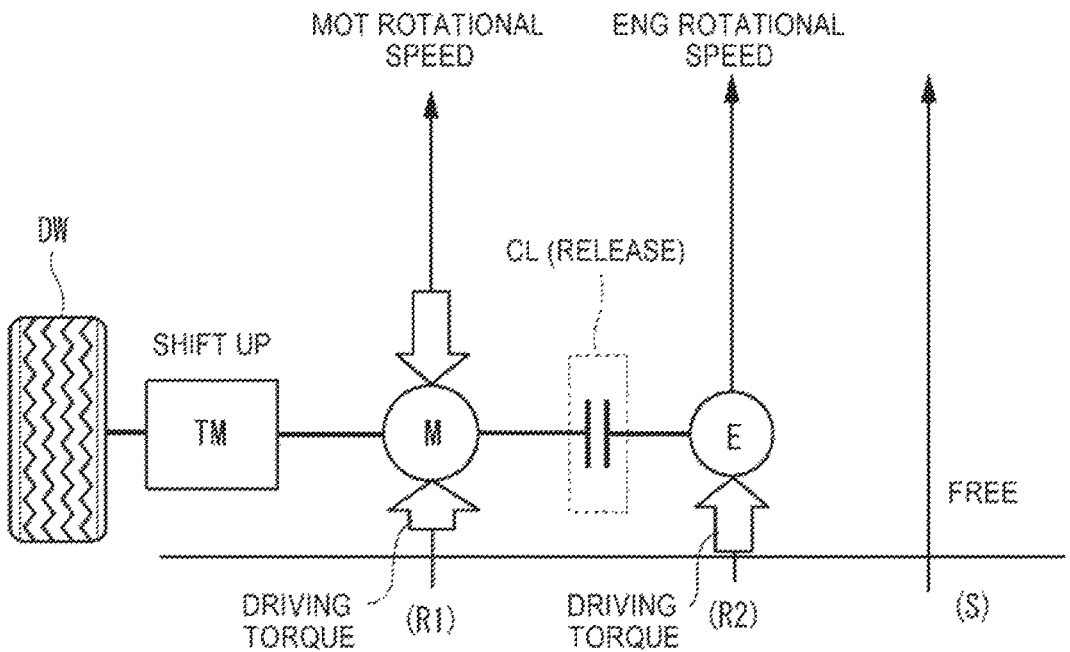

When it is not necessary to perform upshifting at Step SS10, the engine E is autonomously controlled to increase the rotational speed NE of the engine E (Step SS11). When it is necessary to perform upshifting at Step SS10, in a so-called half clutch state in which clutch CL is engaged while slipping, a rotational speed NMOT of the drive motor M is lowered as shown in FIG. 9 (Step SS12). After Step SS11 and Step SS12 are performed, the rotational speed NE of the engine E becomes equal to the rotational speed NMOT of the drive motor M by engaging the clutch CL (Step SS13). Engine travelling by the engine E is performed by starting to drive the engine (Step SS14).

Returning to Step SS1, in Step SS1, the required torque or the required output of the drive motor M is equal to or less than A–Y (Nm) or equal to or less than S (kW), that is, it is within a range of the region (I) of the torque characteristic diagram of FIG. 5, it is determined whether the rotational speed NMOT of the drive motor M is $(1+\alpha) \times K$ (rpm) or less (Step SS15). That is, in a case where the deceleration stator S of the magnetic deceleration mechanism SR is excited to fix the rotational magnetic field, when the minimum starting rotational speed Krpm of the engine E is multiplied by a predetermined speed ratio to calculate the required rotational speed of the drive motor M and the rotational speed NMOT of the drive motor M is not equal to or less than the required rotational speed of the drive motor M, the start control using the magnetic deceleration mechanism SR in Steps SS2 to SS12 is performed.

In Step SS15, when the rotational speed NMOT of the drive motor M is equal to or less than the required rotational speed of the drive motor M, in order to perform the start control using the magnetic deceleration mechanism SR, the rotational speed NMOT of the drive motor M is not sufficient, and thus, as illustrated in FIG. 8, the starting torque Y (Nm) is applied to the drive motor M in addition to the driving torque (Step SS16). Then, the rotational speed NE of the engine E is raised in a so-called half clutch state where the clutch CL is engaged while slipping (Step SS16). After the rotational speed NE of the engine E is raised, the rotational speed NE of the engine E becomes equal to the rotational speed NMOT of the drive motor M by engaging the clutch CL (Step SS13). Then, by starting to drive the engine (Step SS14), engine travelling by the engine E (with motor assist in FIG. 9) is performed.

As described above, according to the embodiment, since the power apparatus 1 has the magnetic deceleration mechanism SR, it is possible to lower the rotational speed at the start of the engine E by exciting to fix the rotational magnetic field of the deceleration stator S of the magnetic deceleration mechanism SR in a state where the clutch CL is released at the start of the engine E. Therefore, the torque of the drive motor M necessary for starting the engine E can be lowered, and thus it is possible to reduce reserve torque which cannot be used for the start of the engine E so far. Thus, it is possible to extend the EV travelling region.

In addition, a harmonic vibration component generated in the mechanical deceleration mechanism is not transmitted to the drive wheel DW by using the magnetic deceleration mechanism SR, and thus vibration characteristics are improved.

Further, the deceleration stator S, the first deceleration rotor R1, and the second deceleration rotor R2 face one another in the radial direction, and thus the magnetic deceleration mechanism SR can be configured by a radial motor.

Second Embodiment

Figure 10:
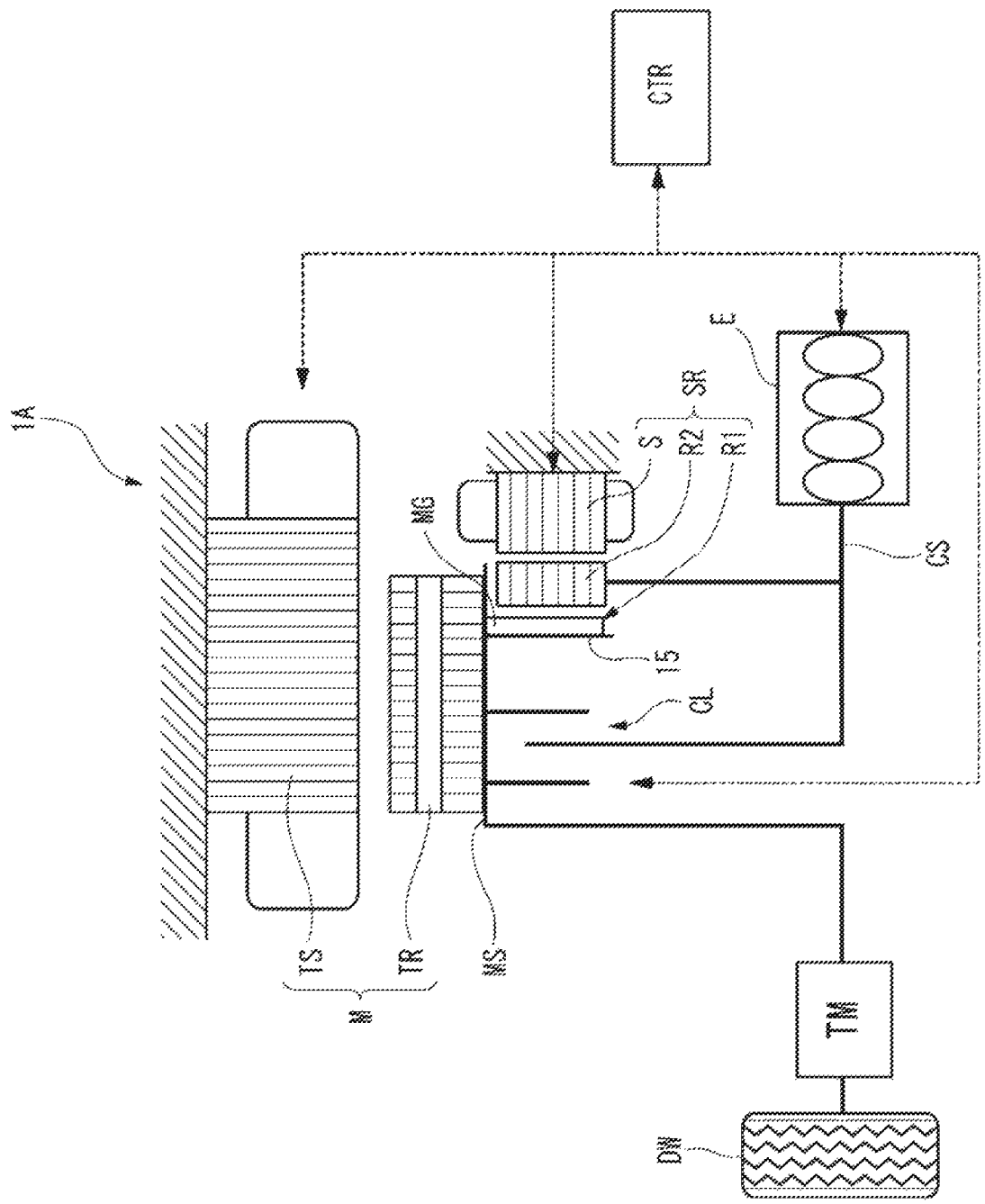
FIG. 10 is a schematic configuration diagram of a power apparatus according to a second embodiment of the invention.

Next, a power apparatus 1A according to a second embodiment of the invention will be described with reference to FIG. 10. The power apparatus 1A of the second embodiment has the same configuration as that of the power apparatus 1 of the first embodiment except that the magnetic deceleration mechanism SR is configured by an axial motor. Therefore, the same components are denoted by the same reference numerals and description thereof will not be repeated.

The magnetic deceleration mechanism SR of the power apparatus 1A of the embodiment includes a deceleration stator S on which excitation coil is wound and which generates rotational magnetic field, a first deceleration rotor R1 which is arranged to axially face the deceleration stator S, and a second deceleration rotor R2 which is provided between the deceleration stator S and the first deceleration rotor R1.

The first deceleration rotor R1 is shared with the drive rotor TR of the drive motor M and a plurality of magnets MG are arranged in a circumferential direction on an inner disc portion 15 extending radially inward from an inner circumferential portion of one axial end portion (right end portion in FIG. 1) of the drive rotor TR. The magnets MG are arranged such that the adjacent magnets MG have mutually different polarities to constitute a magnetic pole row.

The deceleration stator S is arranged to face the magnetic pole row and has an armature row which generates a rotational magnetic field moving in the circumferential direction relative to the magnetic pole row by a plurality of armature magnetic poles generated in a plurality of armatures.

The second deceleration rotor R2 includes a plurality of soft magnetic portions arranged in the circumferential direction at intervals from one another. Further, the second deceleration rotor R2 has a soft magnetic portion row arranged to be positioned between the magnetic pole row and the armature row and is mechanically connected to the crankshaft CS of the engine E.

As described above, even when the magnetic deceleration mechanism SR is configured by an axial motor in which the deceleration stator S, the first deceleration rotor R1, and the second deceleration rotor R2 are axially faced, the same operating characteristics as those of the power apparatus 1 of the first embodiment can be obtained.

Third Embodiment

Figure 11:
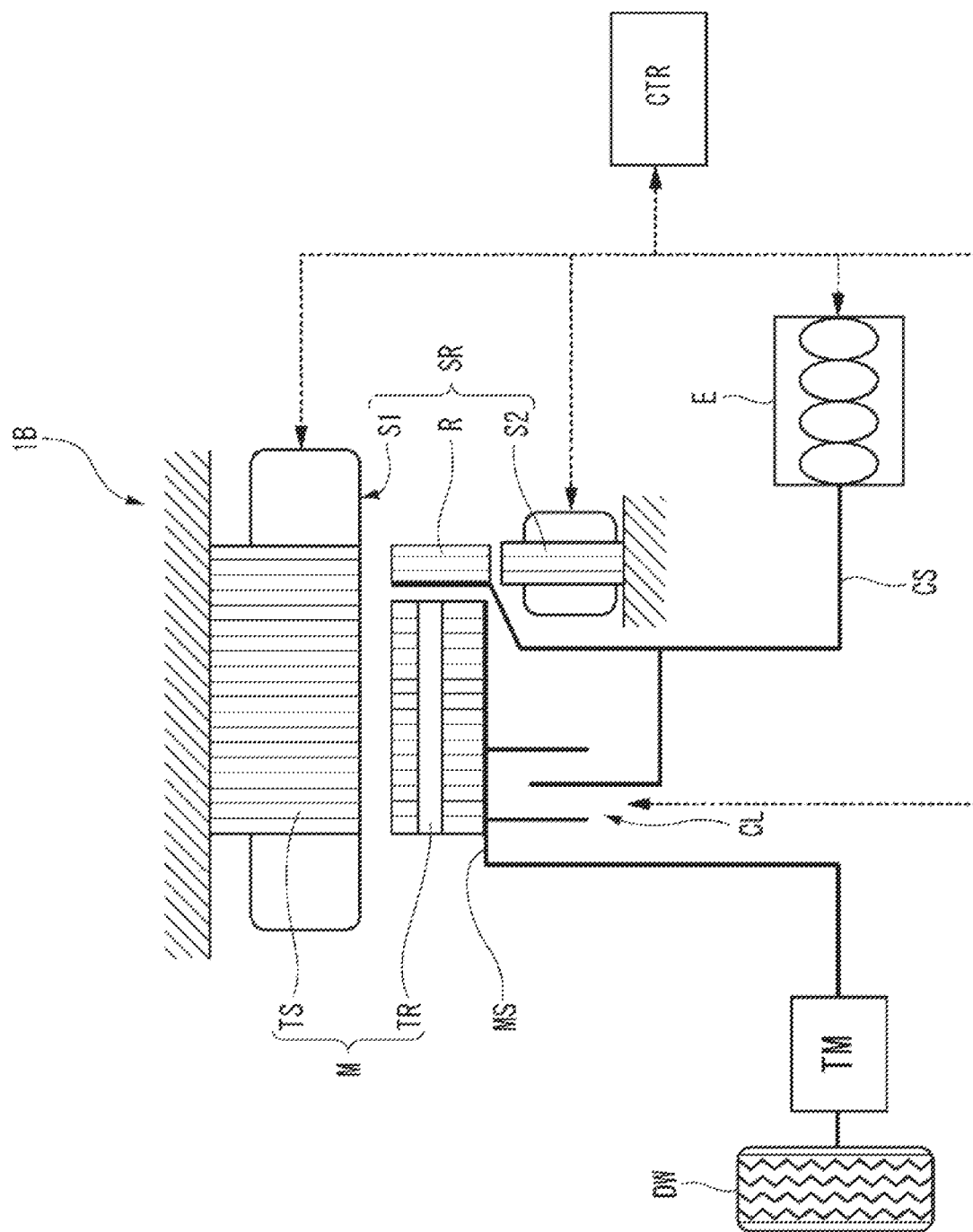
FIG. 11 is a schematic configuration diagram of a power apparatus according to a third embodiment of the invention.

Next, a power apparatus 1 according to a third embodiment of the invention will be described with reference to FIG. 11. In the power apparatuses 1 and 1A according to the first and second embodiments, the drive rotor TR of the drive motor M is shared with the magnetic deceleration mechanism SR. However, in a power apparatus 1B of the embodiment, it is different in that the drive stator TS of the drive motor M is shared with the magnetic deceleration mechanism SR.

The magnetic deceleration mechanism SR includes a first deceleration stator S which is shared with the drive stator $T_S$ of the drive motor M, a second deceleration stator S2 for generating rotational magnetic field, and a deceleration rotor R which has a plurality of soft magnetic portions and is provided between the first deceleration stator S1 and the second deceleration stator S2.

The second deceleration stator S2 is arranged to face the armature row of the first deceleration stator S1 in the radial direction at one axial end portion (right end portion in FIG. 11) of the drive stator TS and the deceleration stator S has an armature row which generates a rotational magnetic field moving in the circumferential direction with an armature row of the first deceleration stator S1 by a plurality of armature magnetic poles generated in a plurality of armatures.

The deceleration rotor R includes a plurality of soft magnetic portions arranged in the circumferential direction at intervals from one another and has a soft magnetic portion row arranged to be located between the armature row of the first deceleration stator S1 and the armature row of the second deceleration stator S2, and further, the deceleration rotor R is mechanically connected to the crankshaft CS of the engine E.

When the number of magnetic pole pairs of the first deceleration stator S1 is set to $\alpha$ and the number of soft magnetic portions of the deceleration rotor R is set to $\beta$ with respect to the number "1" of magnetic pole pairs of the second deceleration stator S2, the it is set to satisfy $\beta=\alpha+1$, where $\alpha \neq 1$. Therefore, as described above, the magnetic deceleration mechanism SR illustrated in FIG. 11 also has the same operating characteristics as those of the power apparatus 100 provided with the planetary gear mechanism illustrated in FIG. 2.

That is, even when the second deceleration stator S2 capable of fixing the rotational magnetic field of the magnetic deceleration mechanism SR is replaced with the sun gear SG of the planetary gear mechanism which can be fixed by the brake B, the first deceleration stator S1 of the magnetic deceleration mechanism SR is replaced with the ring gear RG of the planetary gear mechanism, and the deceleration rotor R of the magnetic deceleration mechanism SR is replaced with the planetary carrier PC of the planetary gear mechanism, the same operating characteristics can be obtained.

Figure 12:
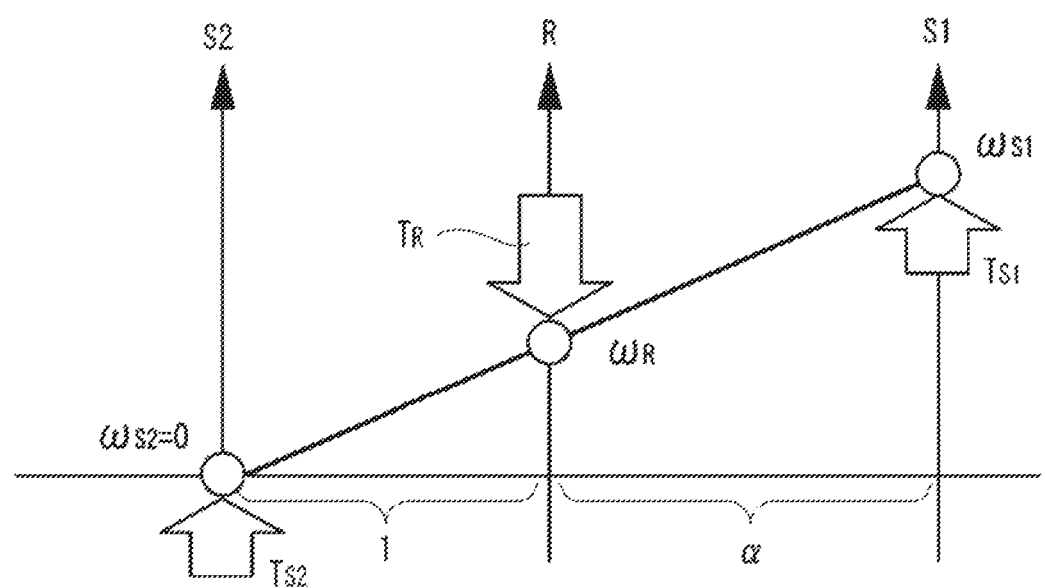
FIG. 12 is a collinear diagram of the magnetic deceleration mechanism incorporated in the power apparatus of FIG. 11.

In the magnetic deceleration mechanism SR, when the second deceleration stator S2 is excited, as illustrated in the collinear diagram of FIG. 12, a field magnetic rotational speed $\omega_{S2}$ of the rotational magnetic field of the second deceleration stator S2, and the angular velocity $\omega_{S1}$ of the first deceleration stator S1, and an angular velocity $\omega_R$ of the deceleration rotor R satisfy the collinear relationship. Also, when the rotational magnetic field of the deceleration stator S is fixed, that is, when the field rotation speed $\omega_S$ of the rotational magnetic field of the second deceleration stator S2 is excited to become zero, the angular velocity $\omega_R$ of the deceleration rotor R will be lower than the angular velocity $\omega_{S1}$ of the first deceleration stator S1 from the collinear relationship. Also, when the deceleration rotor R is rotated according to the speed ratio, the torque $T_{S1}$ acting on the first deceleration stator S1 also decreases. Exciting to fix the rotational magnetic field of the second deceleration stator S2 of the magnetic deceleration mechanism SR has the same effect as engaging the brake B in the power apparatus 100 provided with the planetary gear mechanism PL illustrated in FIG. 2 and fixing the sun gear SG.

When the second deceleration stator S2 is not excited, the second deceleration stator S2, the first deceleration stator S1, and the deceleration rotor R are not synchronized, and thus the collinear relationship is not established.

Even in the power apparatus 1B configured as described above, when the clutch CL is engaged and the engine E is driven, the torque of the engine E is transmitted from the crankshaft CS to the drive wheel DW via the clutch CL and the transmission TM, and thus engine travelling is realized. In this case, when the drive motor M is driven, motor assist traveling is possible.

Further, when the drive motor M is driven in a state where the engine E is stopped and the clutch CL is released, the torque of the drive motor M is transmitted from the motor shaft MS to the drive wheel DW via the transmission TM, and thus EV travelling is realized.

Furthermore, since the power apparatus 1B has the magnetic deceleration mechanism SR, excitation is performed to fix the rotational magnetic field of the second deceleration stator S2 of the magnetic deceleration mechanism SR in a state where the clutch CL is released at the start of the engine E, so that the rotational speed at the start of the engine E can be lowered. Therefore, the torque of the drive motor M necessary for starting the engine E can be lowered, so that it is possible to reduce the reserve torque which cannot be used for the start of the engine E so far, and thus it is possible to extend the EV travelling region.

Fourth Embodiment

Figure 13:
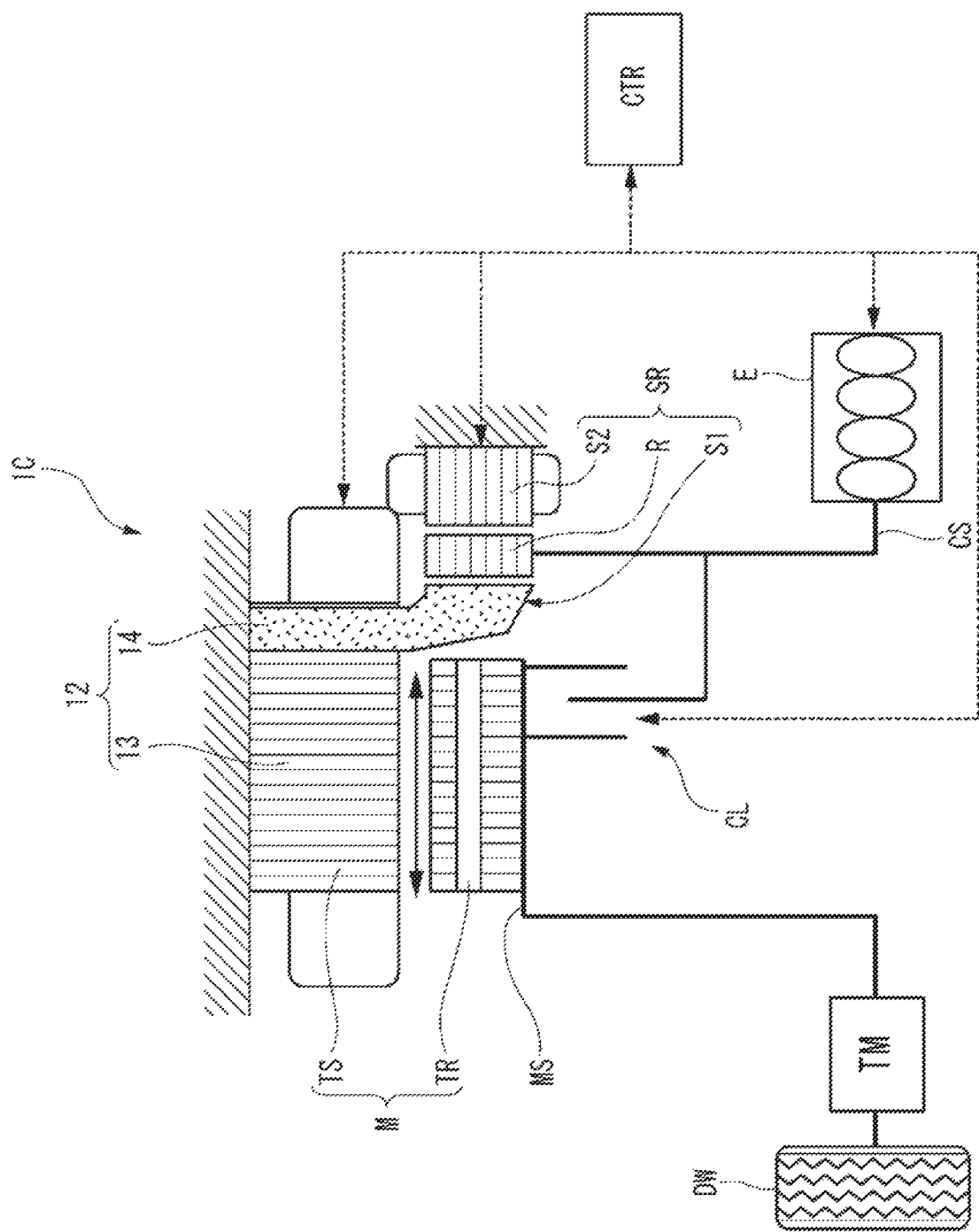
FIG. 13 is a schematic configuration diagram of a power apparatus according to a fourth embodiment of the invention.
Figure 14:
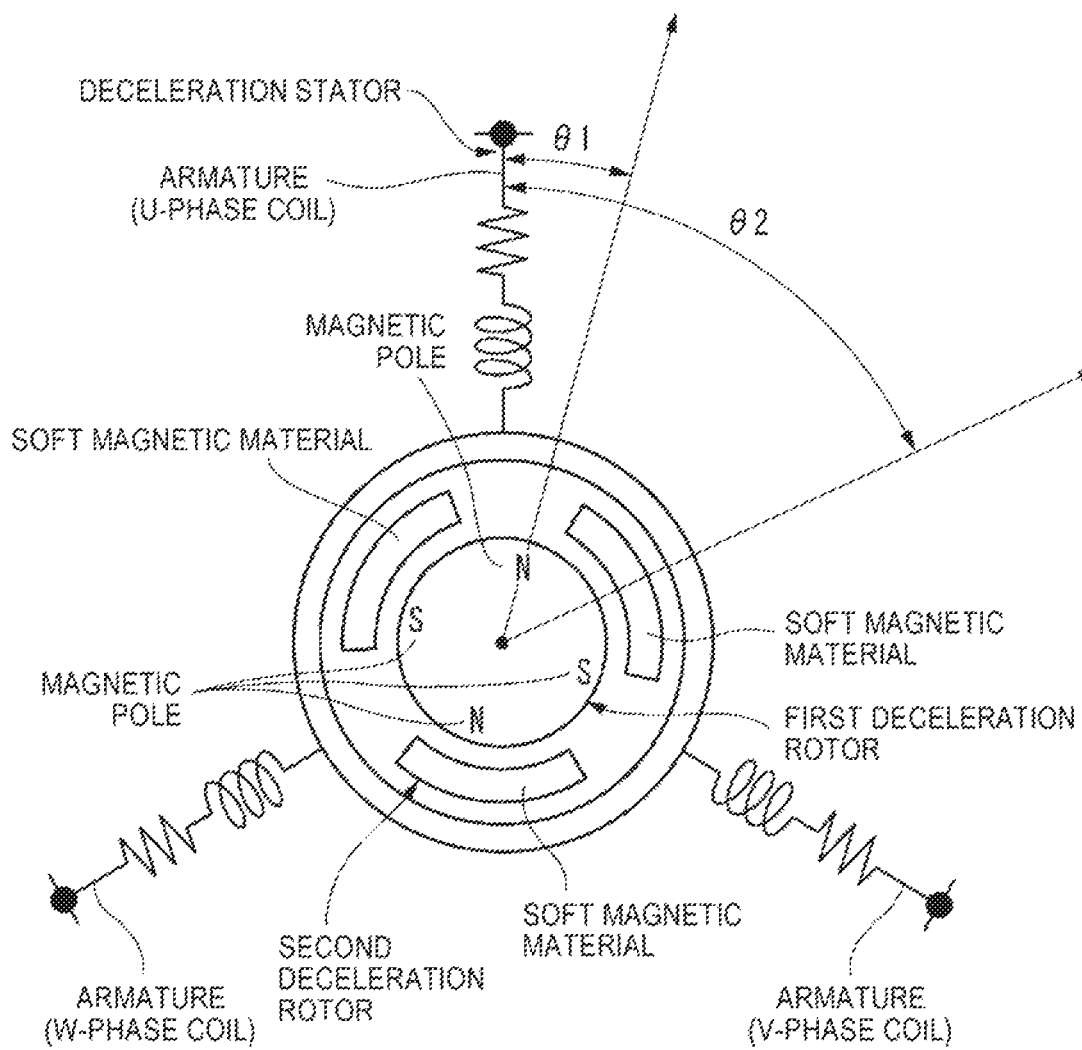
FIG. 14 is an equivalent circuit of the magnetic deceleration mechanism (when $\alpha=2$).
Figure 15:
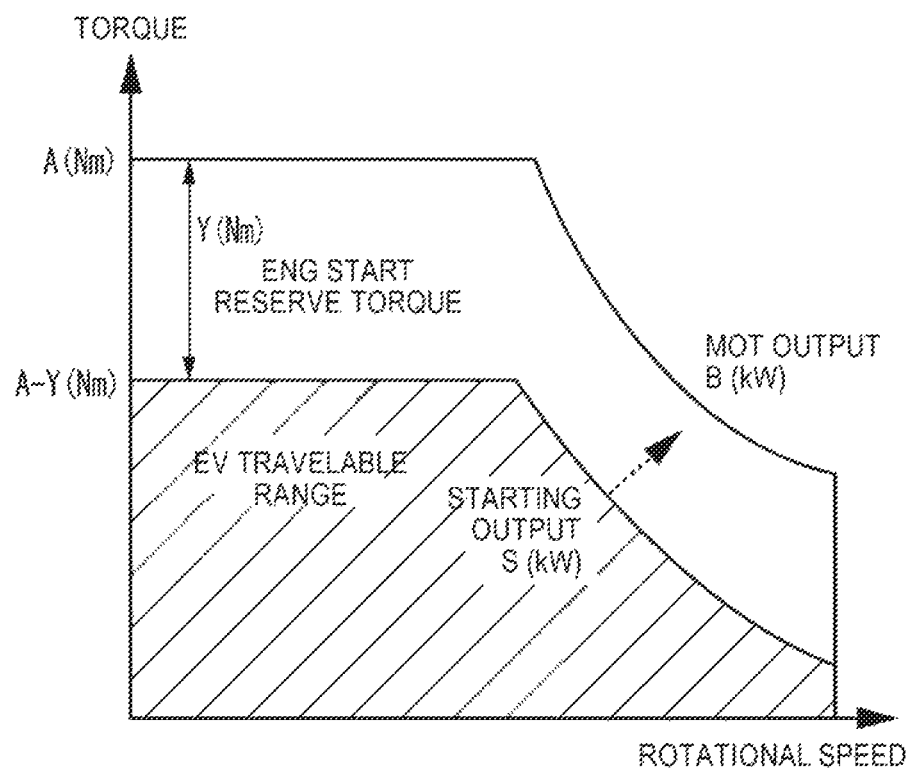
FIG. 15 is a torque characteristic diagram of a related-art drive motor.

Next, a power apparatus 1C according to a fourth embodiment of the invention will be described with reference to FIG. 13. The power apparatus 1C of the fourth embodiment has the same configuration as that of the power apparatus 1B of the third embodiment except that the magnetic deceleration mechanism SR is configured by an axial motor. Therefore, the same components are denoted by the same reference numerals and description thereof will not be repeated.

The magnetic deceleration mechanism SR of the power apparatus 1 of the embodiment includes a first deceleration stator S1 shared with the drive stator TS of the drive motor M, a second deceleration stator S2 for generating a rotational magnetic field, and a deceleration rotor R which has a plurality of soft magnetic portions and is provided between the first deceleration stator S1 and the second deceleration stator S2.

The first deceleration stator S1 is configured such that a stator core 12 formed in one axial end portion (right end portion in FIG. 1) of the drive stator TS is formed to extend to the position of almost the same diameter as the inner circumferential surface of the drive rotor TR. The stator core 12 of the drive stator TS is formed of a hybrid core or the like which includes, for example, a laminated core 13 in which general magnetic steel sheets are laminated and a dust core 14 in which magnetic particles are press-bonded.

The second deceleration stator S2 is arranged to face the armature row of the first deceleration stator S1 in the axial direction at one axial end portion (right end portion in FIG. 13) of the drive stator TS and has an armature row which generates a rotating magnetic field moving in the circumferential direction with the armature row of the first deceleration stator S1 by a plurality of armature magnetic poles generated in the plurality of armatures.

The deceleration rotor R includes a plurality of soft magnetic portions arranged in the circumferential direction at intervals from one another and has a soft magnetic portion row arranged to be located between the armature row of the first deceleration stator S1 and the armature row of the second deceleration stator S2, and further the deceleration rotor R is mechanically connected to the crankshaft CS of the engine E.

As described above, even when the magnetic deceleration mechanism SR is configured by an axial motor in which the second deceleration stator S2, the first deceleration stator S1, and the deceleration rotor R are faced to one another in the axial direction, the same operating characteristics as those of the power apparatus 1 of the third embodiment can be obtained.

The invention is not limited to the embodiments described above and may be appropriately modified, improved, and the like.

The invention claimed is:

1. A power apparatus comprising:
    a drive motor including a drive rotor and a drive stator disposed to face the drive rotor;
    a drive motor shaft mechanically connected to a wheel of a vehicle and configured to rotate integrally with the drive rotor;
    an engine;
    an engine output shaft mechanically connected to the drive motor shaft and configured to output torque of the engine;
    a clutch disposed on a power transmission path between the engine output shaft and the drive motor shaft;
    a controller configured to start-control the engine with the torque of the drive motor; and
    a magnetic deceleration mechanism including:
        a deceleration stator configured to generate a rotational magnetic field;
        a first deceleration rotor including a plurality of magnetic pole portions and facing the deceleration stator; and
        a second deceleration rotor including a plurality of soft magnetic portions and provided between the deceleration stator and the first deceleration rotor,
    wherein the magnetic deceleration mechanism is configured to rotate while maintaining a predetermined collinear relationship between a rotational magnetic field speed of the deceleration stator, a rotational speed of the first deceleration rotor and a rotational speed of the second deceleration rotor by exciting the deceleration stator,
    wherein the second deceleration rotor is mechanically connected to the engine output shaft,
    wherein the first deceleration rotor is shared with the drive rotor, and
    wherein when starting the engine, the controller is configured to make excitation to fix the rotational magnetic field of the deceleration stator in a state where the clutch is released.

2. The power apparatus according to claim 1,
    wherein the first deceleration rotor includes the plurality of predetermined magnetic pole portions aligned in a predetermined direction and has a magnetic pole row arranged such that two adjacent magnetic pole portions have different polarities,
    wherein the deceleration stator is disposed to face the magnetic pole row and has an armature row which is configured to generate a rotational magnetic field moving in the predetermined direction relative to the magnetic pole row by a plurality of predetermined armature magnetic poles generated in a plurality of armatures,
    wherein the second deceleration rotor includes a plurality of predetermined soft magnetic portions aligned in the predetermined direction at intervals from one another and has a soft magnetic portion row arranged to be located between the magnetic pole row and the armature row, and
    wherein when a number of pole pairs of the first deceleration rotor is set to $\alpha$ and a number of soft magnetic portions of the second deceleration rotor is set to $\beta$ with respect to a number "1" of magnetic pole pairs of the deceleration stator, $\beta=\alpha+1$ is satisfied, where $\alpha \neq 1$.

3. The power apparatus according to claim 1,
    wherein the deceleration stator, the first deceleration rotor and the second deceleration rotor face one another in a radial direction.

4. The power apparatus according to claim 1,
    wherein the deceleration stator, the first deceleration rotor and the second deceleration rotor face one another in an axial direction.

5. The power apparatus according to claim 1,
    wherein in the drive motor, the drive rotor is disposed to face a radially inner side of the drive stator, and
    wherein the magnetic pole portion of the first deceleration rotor of the magnetic deceleration mechanism includes magnets arranged in a circumferential direction on an inner circumferential portion of the drive rotor of the drive motor.

6. A power apparatus comprising:
a drive motor including a drive rotor and a drive stator disposed to face the drive rotor;
a drive motor shaft mechanically connected to a wheel of a vehicle and configured to rotate integrally with the drive rotor;
an engine;
an engine output shaft mechanically connected to the drive motor shaft and configured to output torque of the engine;
a clutch disposed on a power transmission path between the engine output shaft and the drive motor shaft;
a controller configured to start-control the engine with the torque of the drive motor; and
a magnetic deceleration mechanism including:
  a first deceleration stator shared with the drive stator of the drive motor;
  a second deceleration stator configured to generate a rotational magnetic field; and
  a deceleration rotor including a plurality of soft magnetic portions and provided between the first deceleration stator and the second deceleration stator,
wherein the magnetic deceleration mechanism is configured to rotate while maintaining a predetermined collinear relationship between a rotational magnetic field speed of the second deceleration stator, a rotational magnetic field speed of the first deceleration stator and a rotational speed of the deceleration rotor by exciting the second deceleration stator,
wherein the deceleration rotor is mechanically connected to the engine output shaft, and
wherein when starting the engine, the controller allowing excitation to fix the rotational magnetic field of the second deceleration stator in a state where the clutch is released.

7. The power apparatus according to claim 6,
wherein the second deceleration stator is arranged to face an armature row of the first deceleration stator and has an armature row which generates a rotational magnetic field moving in a predetermined direction with the armature row of the first deceleration stator by a plurality of predetermined armature magnetic poles generated in a plurality of armatures,
the deceleration rotor includes the plurality of predetermined soft magnetic portions aligned in the predetermined direction at intervals from one another and has a soft magnetic portion row arranged to be located between the armature row of the first deceleration stator and the armature row of the second deceleration stator, and
when a number of magnetic pole pairs of the first deceleration stator is set to $\alpha$ and a number of soft magnetic portions of the deceleration rotor is set to $\beta$ with respect to a number "1" of magnetic pole pairs of the second deceleration stator, $\beta=\alpha+1$ is satisfied, where $\alpha \neq 1$.

8. The power apparatus according to claim 6,
wherein the second deceleration stator, the first deceleration stator, and the deceleration rotor face one another in a radial direction.

9. The power apparatus according to claim 6,
wherein the second deceleration stator, the first deceleration stator, and the deceleration rotor face one another in an axial direction.

10. A power apparatus comprising:
a drive motor including a drive rotor and a drive stator disposed to face the drive rotor;
a drive motor shaft mechanically connected to a wheel of a vehicle and configured to rotate integrally with the drive rotor;
an engine;
an engine output shaft mechanically connected to the drive motor shaft and configured to output torque of the engine,
a clutch disposed on a power transmission path between the engine output shaft and the drive motor shaft;
a controller configured to start-control the engine with the torque of the drive motor; and
a magnetic deceleration mechanism configured to reduce torque of the drive motor necessary for starting the engine by magnetically reducing a rotational speed of the engine output shaft during a start control,
wherein when starting the engine, the controller is configured to excite the magnetic deceleration mechanism in a state where the clutch is released.

* * * * *